May 29, 1951 E. G. STAUDE 2,554,843
PROPORTIONAL PRESSURE DOUBLE-ACTING POWER AMPLIFIER
Filed July 31, 1945 17 Sheets-Sheet 5

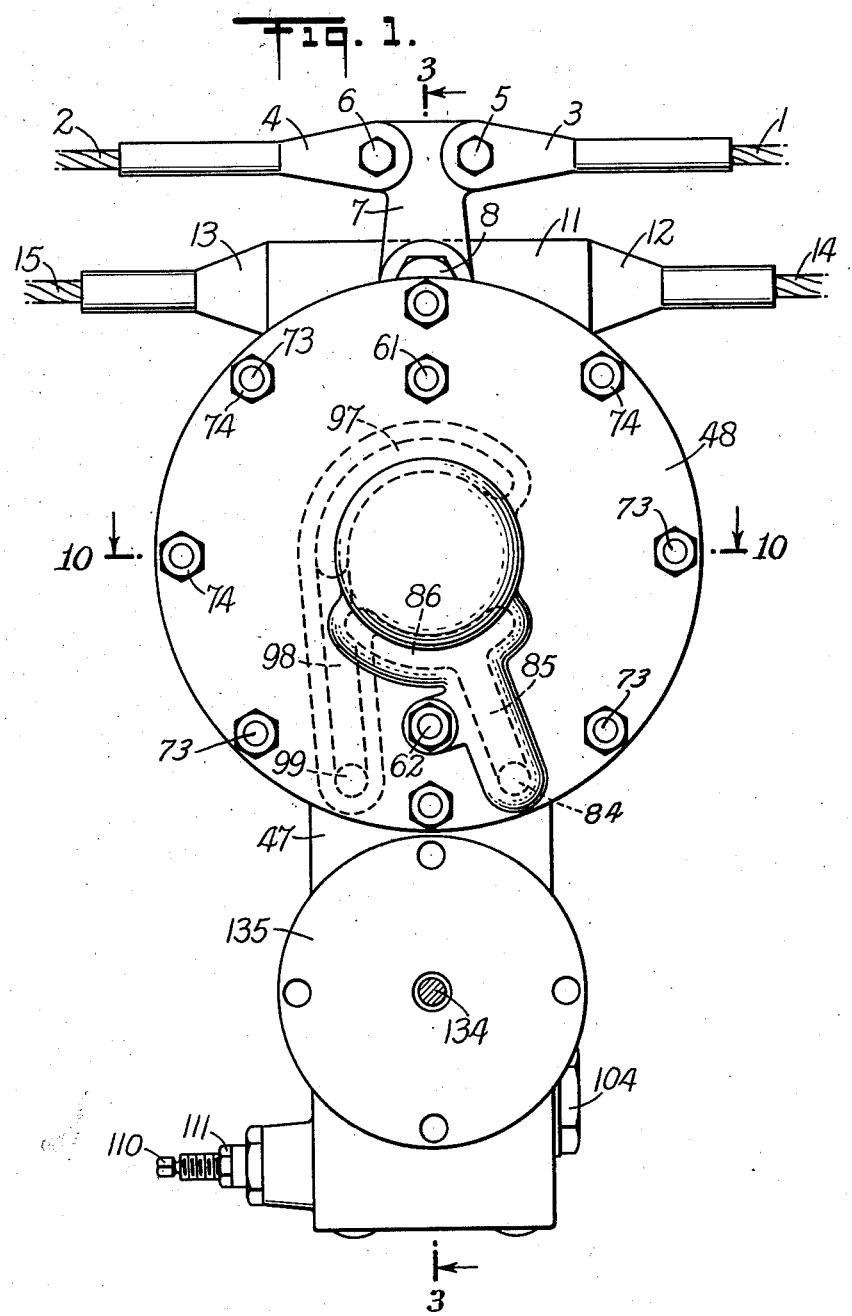

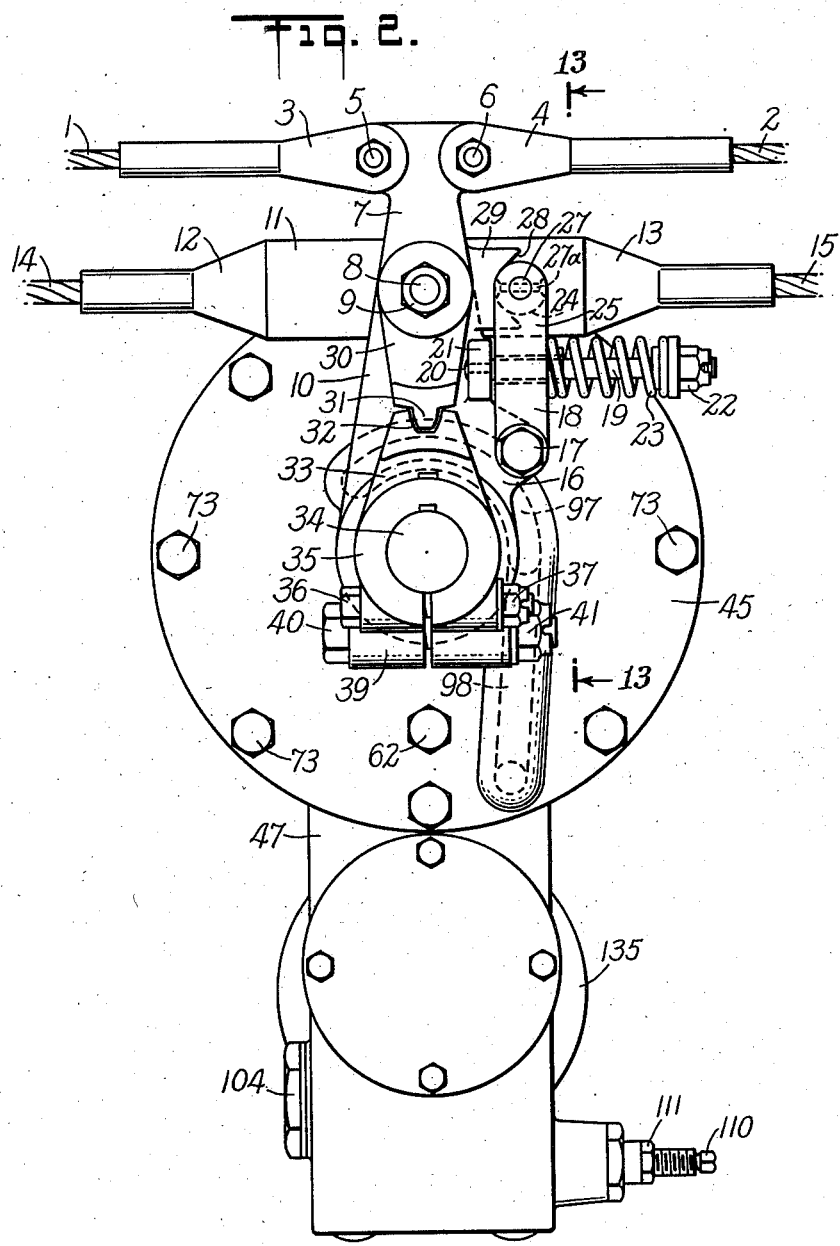

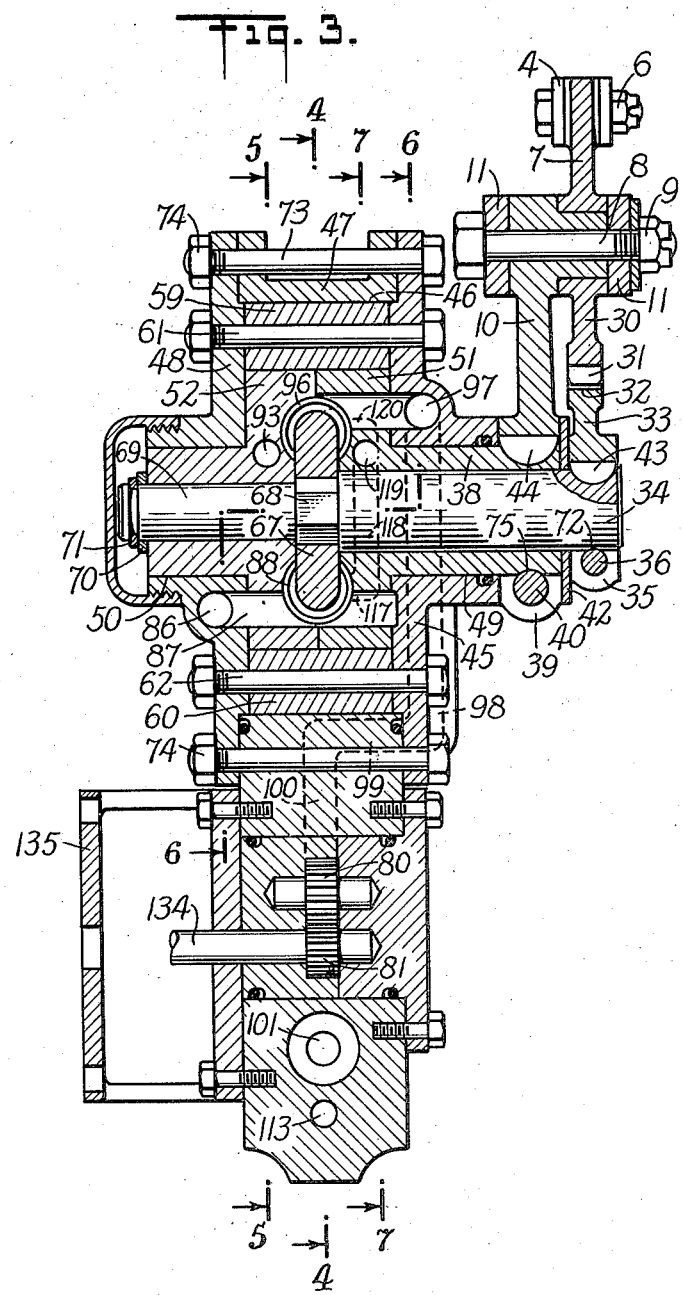

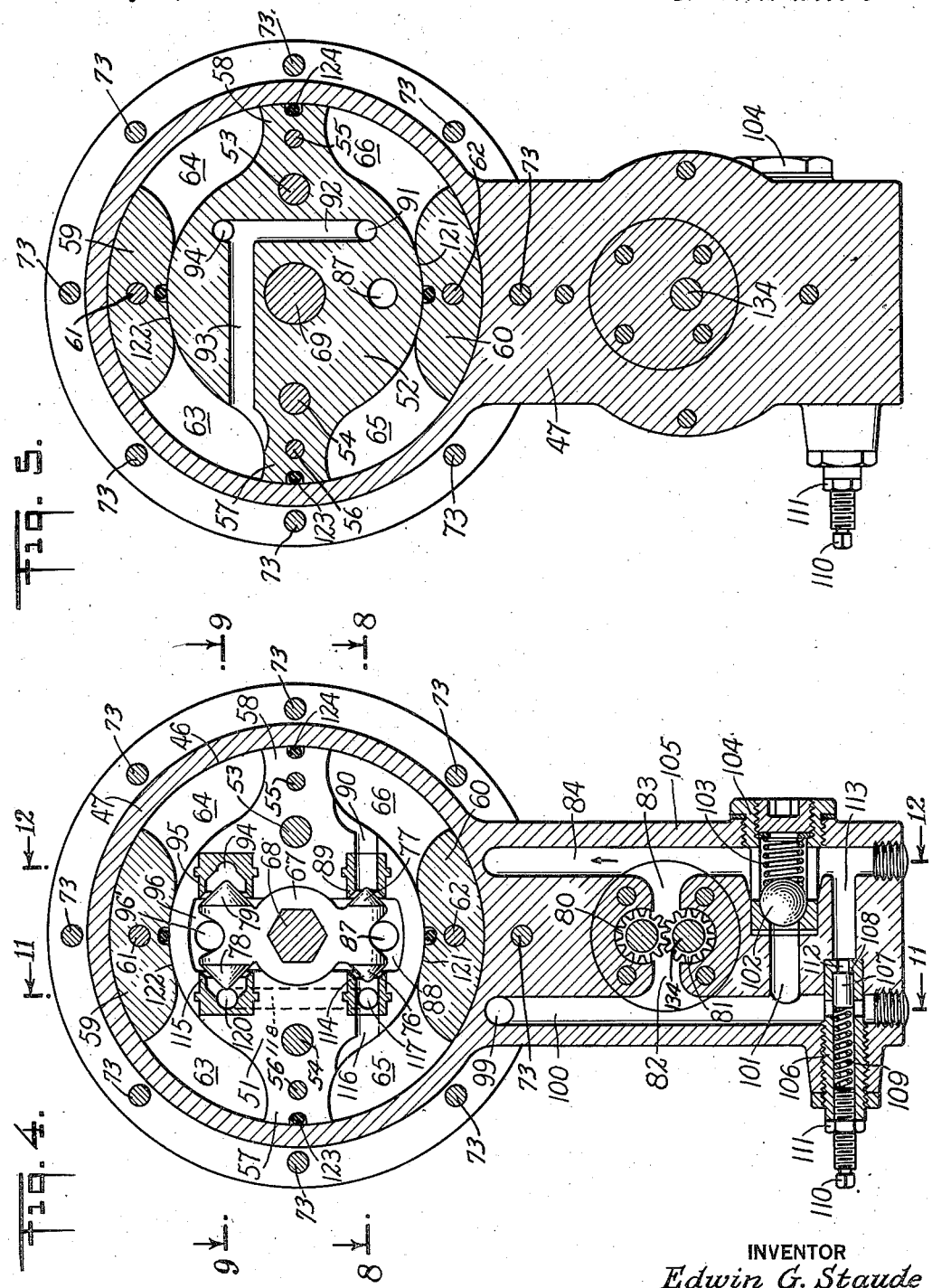

INVENTOR
Edwin G. Staude
BY
Arthur Wright
ATTORNEY

May 29, 1951 E. G. STAUDE 2,554,843
PROPORTIONAL PRESSURE DOUBLE-ACTING POWER AMPLIFIER
Filed July 31, 1945 17 Sheets-Sheet 6

INVENTOR
Edwin G. Staude
BY
Arthur Wright
ATTORNEY

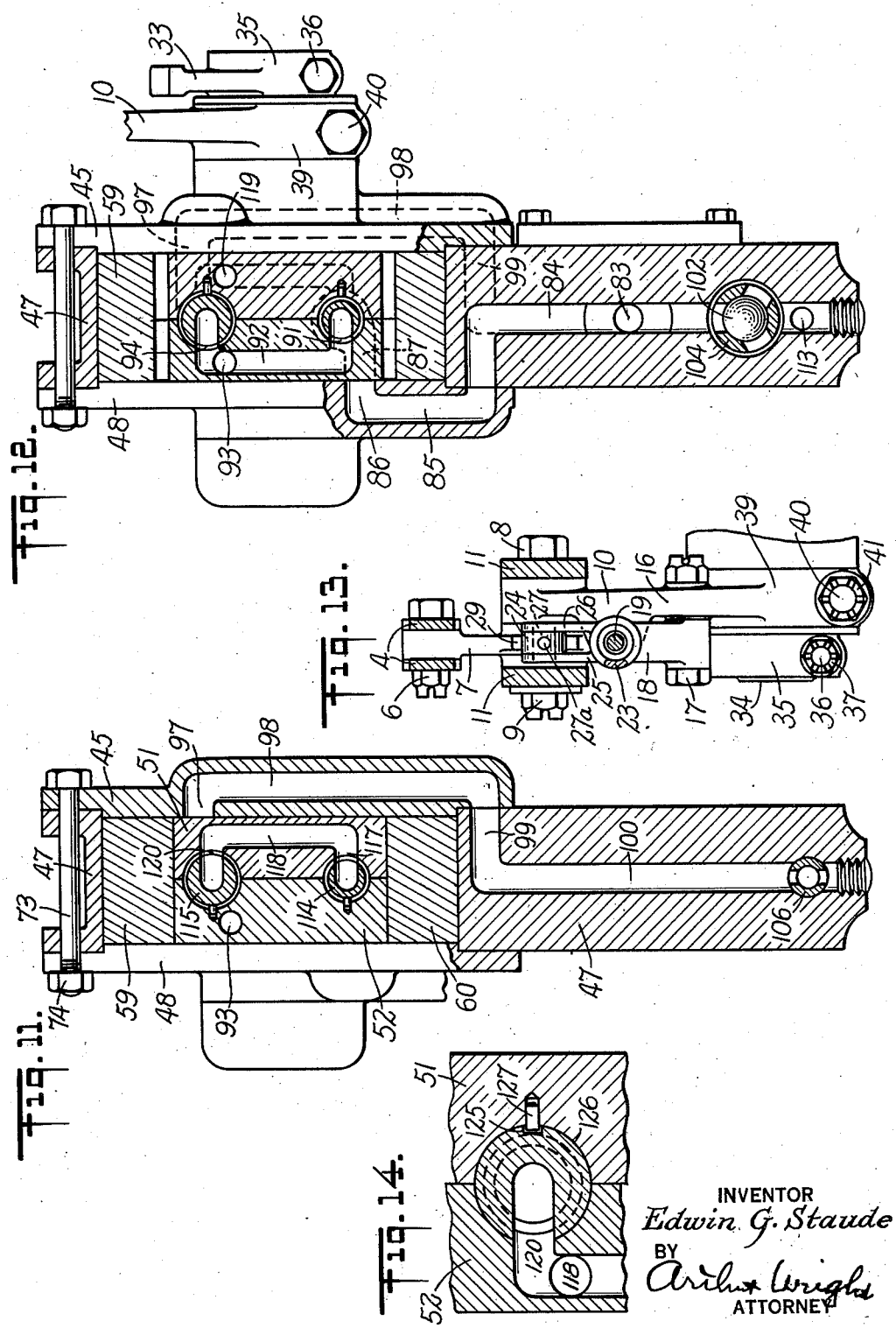

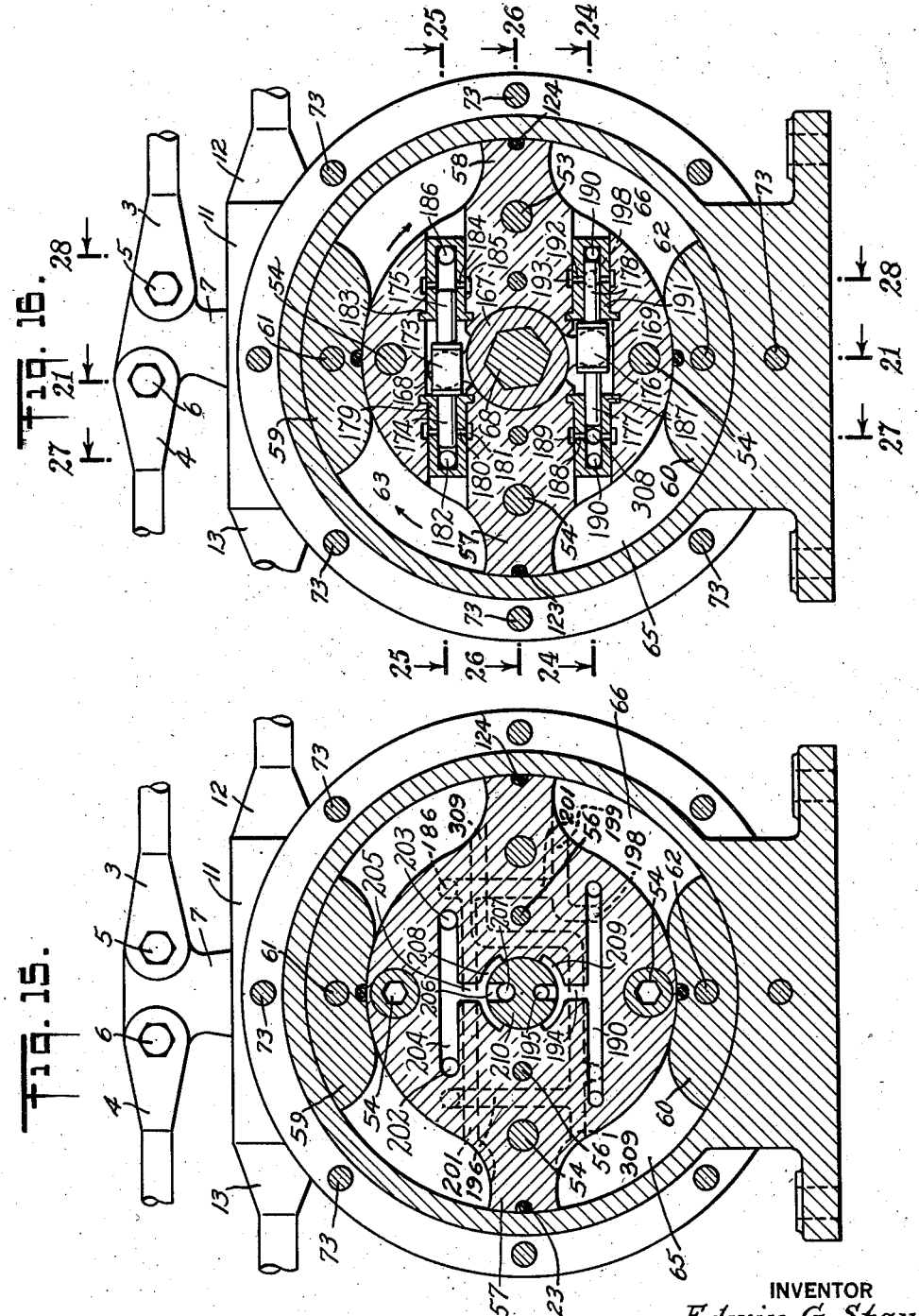

May 29, 1951 E. G. STAUDE 2,554,843
PROPORTIONAL PRESSURE DOUBLE-ACTING POWER AMPLIFIER
Filed July 31, 1945 17 Sheets-Sheet 9

INVENTOR
Edwin G. Staude
BY
Arthur Wright
ATTORNEY

May 29, 1951     E. G. STAUDE     2,554,843
PROPORTIONAL PRESSURE DOUBLE-ACTING POWER AMPLIFIER

Filed July 31, 1945     17 Sheets-Sheet 10

INVENTOR
*Edwin G. Staude*
BY
*Arthur Wright*
ATTORNEY

INVENTOR
Edwin G. Staude
BY
Arthur Wright
ATTORNEY

May 29, 1951 E. G. STAUDE 2,554,843
PROPORTIONAL PRESSURE DOUBLE-ACTING POWER AMPLIFIER
Filed July 31, 1945 17 Sheets-Sheet 12
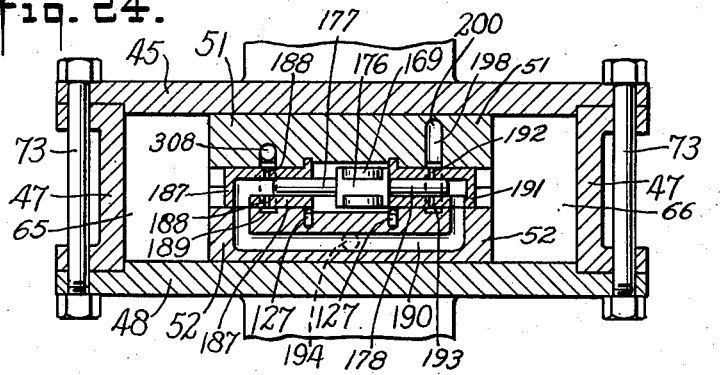
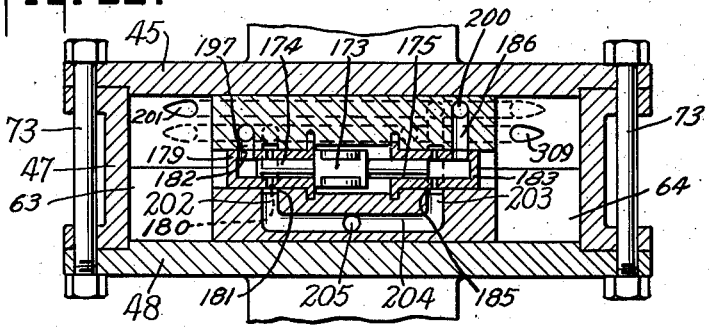
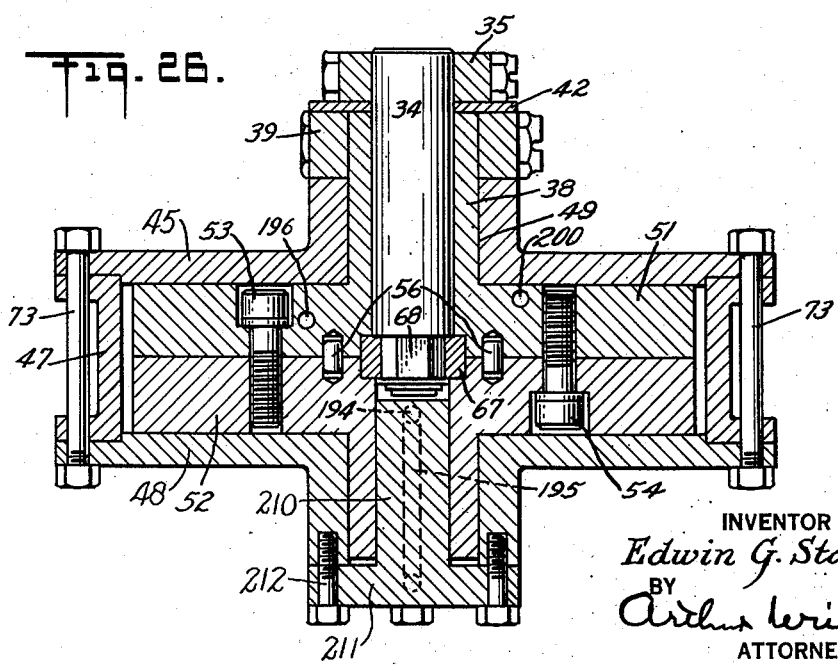
INVENTOR
Edwin G. Staude
BY
Arthur Wright
ATTORNEY

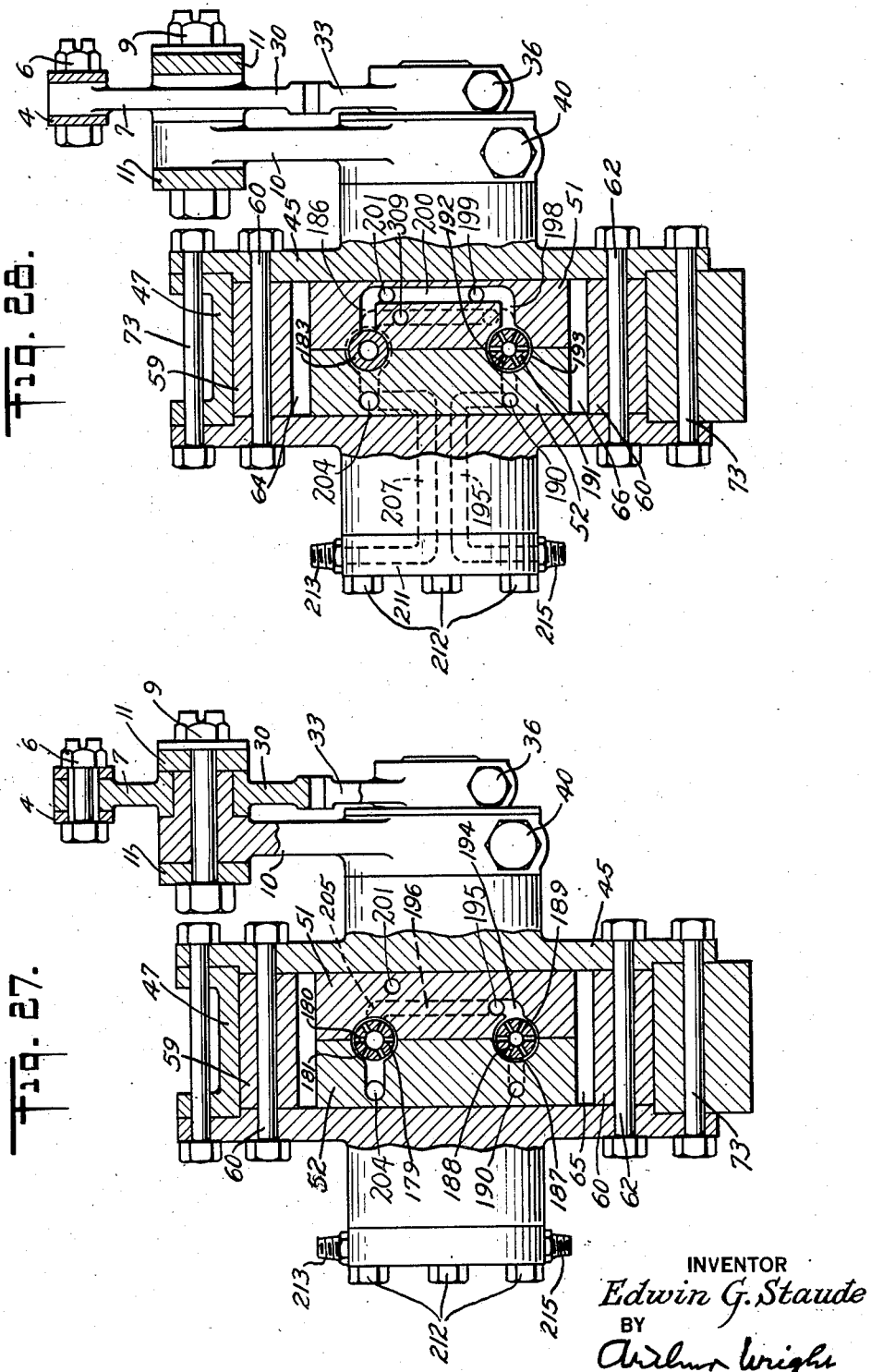

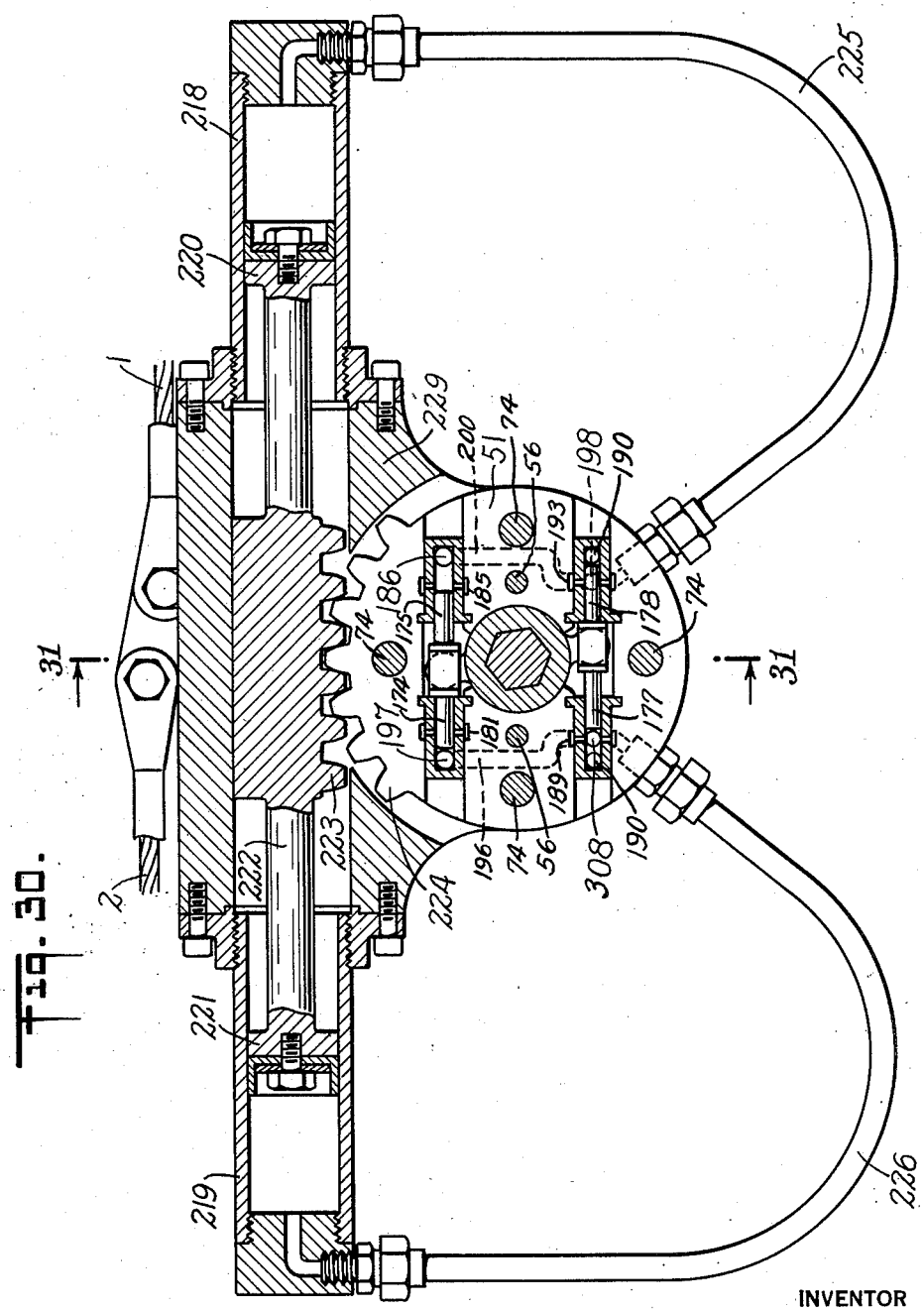

May 29, 1951 E. G. STAUDE 2,554,843
PROPORTIONAL PRESSURE DOUBLE-ACTING POWER AMPLIFIER
Filed July 31, 1945 17 Sheets-Sheet 15

INVENTOR
Edwin G. Staude
BY
Arthur Wright
ATTORNEY

May 29, 1951 E. G. STAUDE 2,554,843
PROPORTIONAL PRESSURE DOUBLE-ACTING POWER AMPLIFIER
Filed July 31, 1945 17 Sheets-Sheet 16
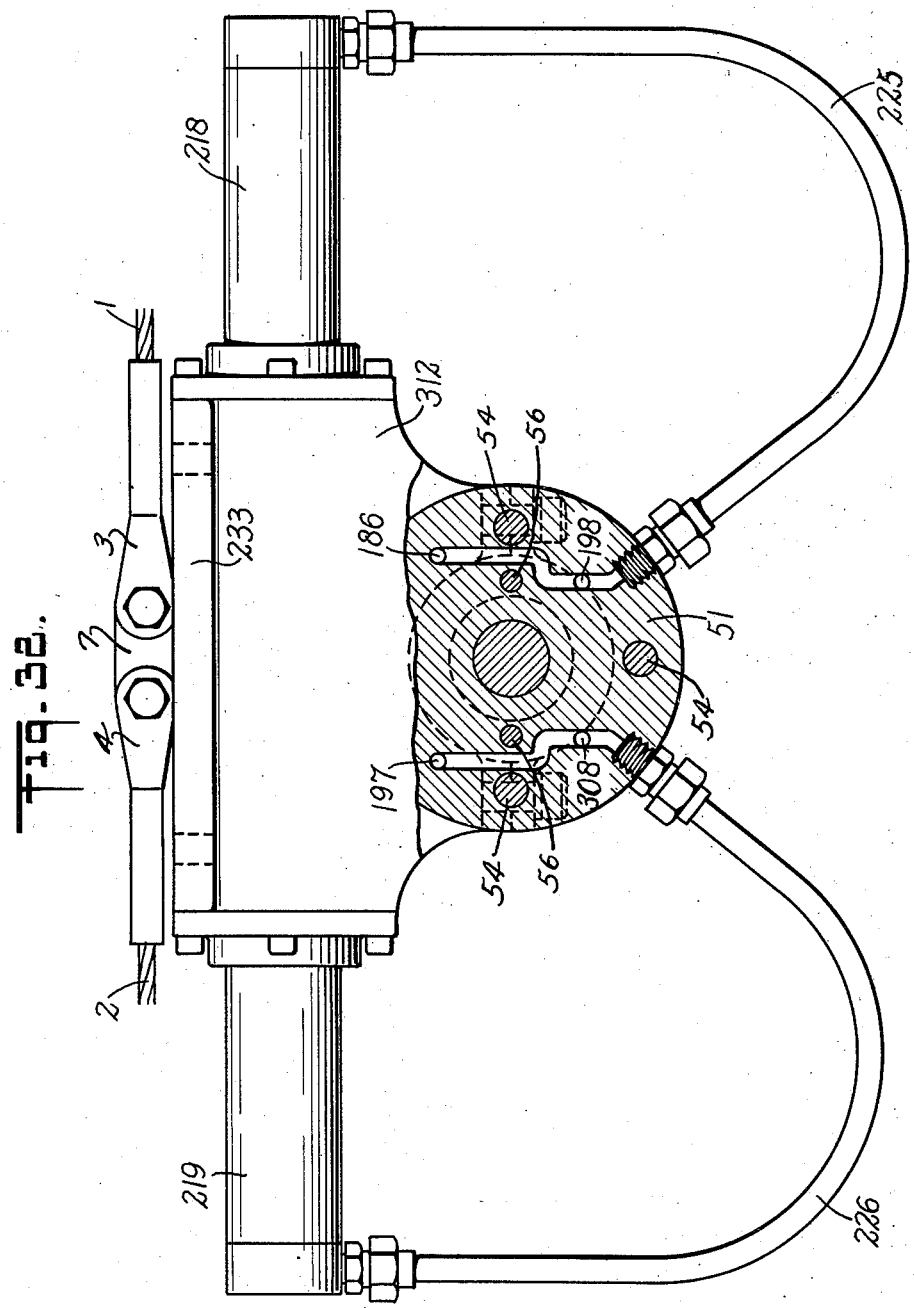
INVENTOR
Edwin G. Staude
BY
Arthur Wright
ATTORNEY

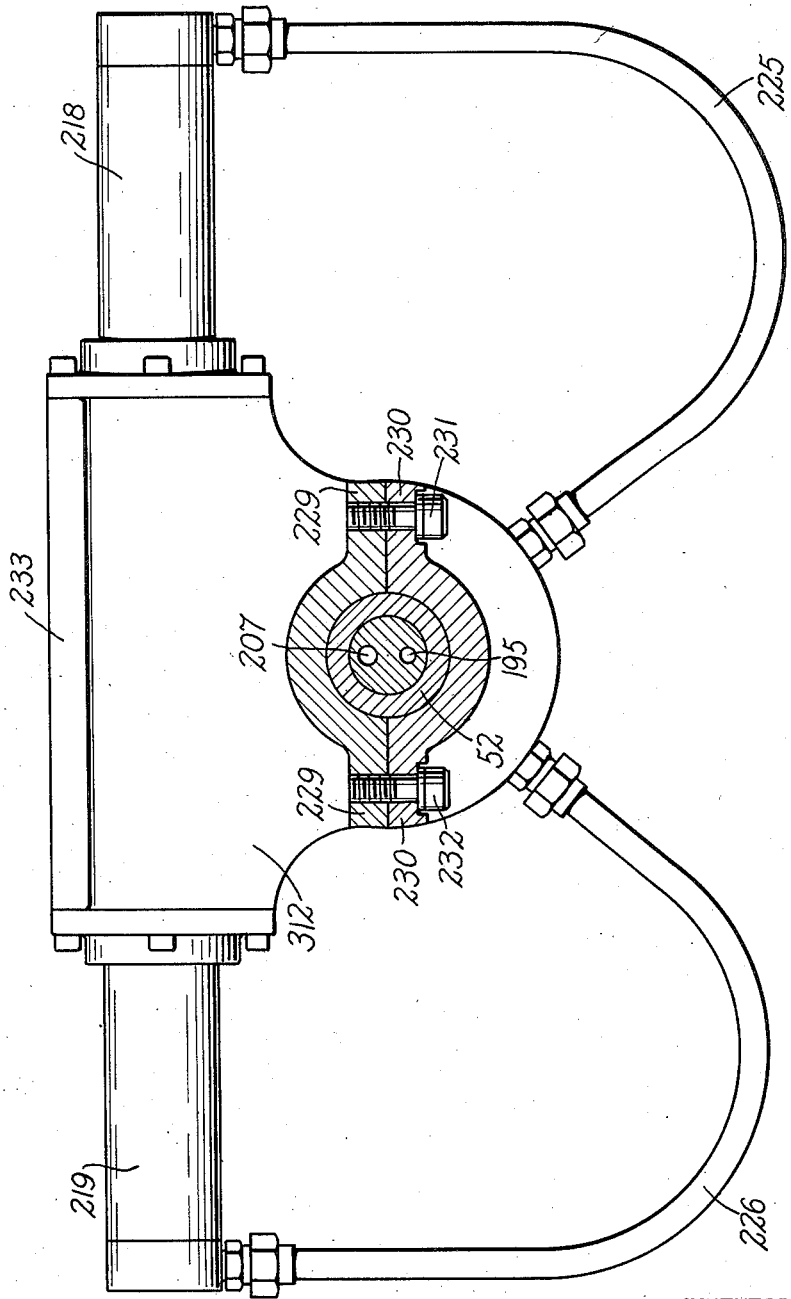

Patented May 29, 1951

2,554,843

UNITED STATES PATENT OFFICE 2,554,843

PROPORTIONAL PRESSURE DOUBLE-ACTING POWER AMPLIFIER

Edwin G. Staude, Minneapolis, Minn., assignor of one-half to Olive Bertha Staude, Minneapolis, Minn.

Application July 31, 1945, Serial No. 607,945

20 Claims. (Cl. 60—52)

My invention is particularly applicable to assist in the manual operation of the rudder, elevators, ailerons, or landing brakes of airplanes, or for steering gears or brakes on motor cars, busses, etc., although it is capable of many other different fields of utilization.

My invention is, also, particularly desirable in airplanes which fly at high altitude, because the fluid being a very low-freezing liquid and in continuous circulation, keeps the device from freezing which has frequently occurred previously in other devices where compressed air has been used.

This invention is an improvement over my copending application upon "Double Acting Proportional Pressure Power Amplifier," Serial No. 513,647, filed December 8, 1943, Patent No. 2,465,761, granted March 29, 1949, wherein I use a system of a single fluid circulating medium and wherein a part of the built-up pressure reacts against the control lever to obtain the performance "feel," so that the operator will always have a definite control and a sense of the increased stroke and pressure required for the work to be performed, whereas in my present invention I use a second set of valves to distribute the flow in both directions from an inactive neutral position for distribution and uniform flow in each of the directions of motion of each of the valves.

I have obtained a pressure "feel" control in my earlier patent, Patent No. 2,095,841, granted October 12, 1937, upon "Power Amplifier for Motor Car Controls," in which through a reverse-motion action I am enabled to restrict or throttle the flow of fluid to build up pressure by a valve located to oppose the flow of fluid in the circuit. This built-up pressure, obviously, reacts against the control lever because of the reverse mechanism without sacrificing the direction of motion of the control lever, and in such a manner that the device may be operated manually in the event of failure of the fluid circulating system.

In my copending application aforesaid and in this present application, which have to do with an apparatus, I utilize this same reverse mechanism, but so that it acts in both directions from a neutral central position, in a valve control such as shown in my Patent No. 2,095,841, aforesaid. I have found this to be highly efficient, except that I now adapt this reverse mechanism to act in both directions, inasmuch as my preceding and present amplifier are double acting, that is to say, operable in either direction, whereas the reverse mechanism shown in my Patent No. 2,095,841 operates only in one direction, relying on retractor springs to return the mechanism to its starting point. This invention comprises the broad idea of a single fluid inlet and a single fluid outlet with two circuits interposed between them. It contains a double acting device, such as a piston or vane to perform work, against which fluid under pressure acts and with which two fluid circuits are provided having single or separate fluid inlet and outlet passages, but which are provided with fluid controlling valves operating simultaneously to obtain fluid pressure in one circuit to perform work and open the circuit in the other passage to exhaust the fluid on the other side of the means against which pressure acts to perform work. Thereby, the degree of movement or work to be performed is controlled through the amount of fluid pressure admitted by the valves and, thereby overrunning of the work to be performed is prevented by connections between the surfaces against which pressure acts and the valve seats or sleeves.

This device, for example, is illustrated herein as a double equal-acting fluid power actuator which uses a single source of fluid and divides the circuit into two circuits leading to two chambers and returns the same to the source of power with two distributor valves to distribute the flow and two reacting valves operating against pressure to provide the reaction pressure.

The two distributor valves divide the flow to the respective work performing elements which are movable walls whereby when in neutral or center position two equal flow circuits result.

A shift of both said distributor valves in either direction will cause decreased flow in one circuit and increased flow in the other which flow in each case is connected to the appropriate movable wall or work performing element which is interposed between the respective distributor valve and the reaction return flow valve.

The reactionary valve takes the increased flow from the movable wall and by movement restricts the outflow by opposing the flow of the circuit against pressure which reacts against the valve control means.

The proportionate increase of pressure reacts against the work performing element or movable wall while the action of the opposite reaction valve works in reverse to decrease the exhaust pressure proportionately whereby complete control of the movable wall is maintained at all times, while at the same time the unbalanced pressure has a tendency to return the four valves to neutral by the action of the control of the flow of the fluid in the two circuits.

While one circuit becomes the pressure circuit the other becomes the exhaust circuit both of which are always under the control of the valve control means.

By using the four valves and the two fluid circuits I am able to increase the pressure in one circuit and at the same time proportionately decrease the pressure in the other thereby preventing over-running and at the same time maintaining perfect follow up in both directions of operation with the motion of the valve controlling means.

The fluid passages and the compartments in which the vanes or movable walls operate in accordance with my present invention are always filled with fluid under circulating pressure, so that the slightest movement of the valves in either direction creates an instantaneous pressure response, thereby preventing even the slightest lag or over-running.

While I have shown a pump as an integral part of my invention, it is obvious that it may be operated in any other convenient way. Also, the degree of assistance can be readily controlled by the pressure and the area against which the pressure fluid acts.

One of the important objects of my invention is to counterbalance the pressures on the oscillating vanes of my double acting fluid power amplifier, so that the bearing or pivot of the vanes may carry only the load of the actual work performed.

A further object is to direct the fluid when under pressure to the vanes equally on opposite sides of the pivot of both vanes to aid in the motion thereof in the same direction.

Another object is greatly to reduce the distance of travel of the fluid from the output passage to the input passage of the pump, thereby greatly decreasing frictional losses and the attendant heat generated thereby.

A further object is to split the circuit for the liquid when the cruising circuit is being used and then cause the same to travel in passages connecting both sides of the vanes when idling, thereby providing, in effect, larger passages for the flow of the fluid and producing correspondingly less heat and a lower idling circuit pressure within a minimum space.

Still another object of my invention is to provide a multiple pressure modulating valve which, when closing and traveling with the flow of the fluid, is of smaller area than the valve opposing the flow of the fluid, in order to obtain a pressure reaction on the manual control lever, for the purpose of feeling the increase in pressure.

A further object is to provide a piston valve of small area whereby the pressure may be sealed off easily and made oil-tight when the amplifier is being operated by static pressure.

Again, a further object is to provide a multiple poppet or piston valve which opposes the pressure or the direction of fluid flow.

Another object of my invention is to provide a power amplifier using a single pump with a single inlet and a single outlet to and from the power unit, but with a split circuit within the unit when in action, to provide instantaneous response in one direction as the other circuit is starting to close off by the action of the reverse motion valve control mechanism.

A further object is to provide an apparatus of this character of small size arranged to be operable at high pressure and which may be easily manufactured and assembled.

Other objects of my invention will readily appear from the accompanying drawings and specifications and the detailed description thereof.

While I show in the accompanying drawings a cruising circuit in which the fluid is in continuous motion, I do not wish to limit my invention thereto as I may start the fluid pressure generating mechanism by the initial movement of the control lever in a manner similar to that shown and described in my Patent No. 2,095,841 aforesaid, or I may use static pressure for this purpose, as hereinafter shown and described.

Although my invention is intended to use a special very low-freezing point oil for the circulating fluid, I do not wish to limit my invention thereto because to use compressed air or atmospheric pressure instead is merely a matter of adaptation thereof.

While my invention is capable of embodiment in many different forms, for the purpose of illustration I have only shown certain forms thereof in the accompanying drawings, in which:

Fig. 1 is a front elevation of an apparatus made in accordance with my invention;

Fig. 2 is a similar view from the opposite side thereof;

Fig. 3 is a vertical section on a line 3—3 of Fig. 1;

Fig. 4 is a vertical section on the line 4—4 of Fig. 3;

Fig. 5 is a vertical section on the line 5—5 of Fig. 3;

Fig. 11 is a vertical section on line 11—11 of Fig. 4;

Fig. 12 is a vertical section on line 12—12 of Fig. 4;

Fig. 13 is a vertical section of the valve controlling levers on the line 13—13 of Fig. 2;

Fig. 14 is a detail of the valve seat mounting shown in Fig. 9;

Fig. 15 is a vertical section on line 15—15 of Fig. 21 showing the passages of a modified valve construction wherein the valves, instead of being of the "poppet" type, are piston valves, so as to adapt the system for use in connection with static pressure, that is to say, where the fluid is not in continuous circulation;

Fig. 16 is a vertical section on line 16—16 of Fig. 21 through the valve seat member and shows the valves in an extreme position;

Fig. 24 is a horizontal section on the line 24—24 of Fig. 16;

Fig. 25 is a horizontal section on the line 25—25 of Fig. 16;

Fig. 26 is a horizontal section on the line 26—26 of Fig. 16;

Fig. 27 is a vertical section on the line 27—27 of Fig. 16;

Fig. 28 is a vertical section on the line 28—28 of Fig. 16;

Fig. 30 is a vertical section showing the application of my power amplifier, adapted for cylinder and piston auxiliary power;

Fig. 32 is an end view of my amplifier, partly in section, showing the valve passages in section; and Fig. 33 is a side view, partly in section, of my power amplifier looking towards the control cables and showing the manner of mounting the oscillating members.

Figure 6:
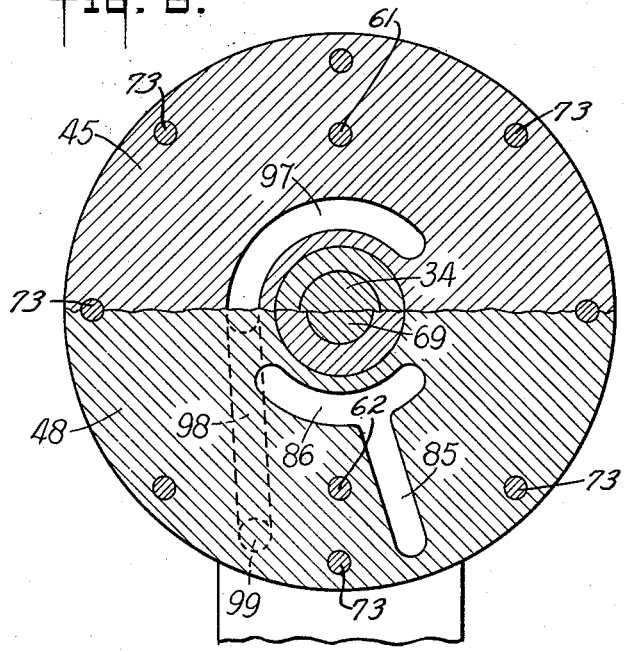
Fig. 6 is a vertical section on the line 6—6 of Fig. 3.
Figure 7:
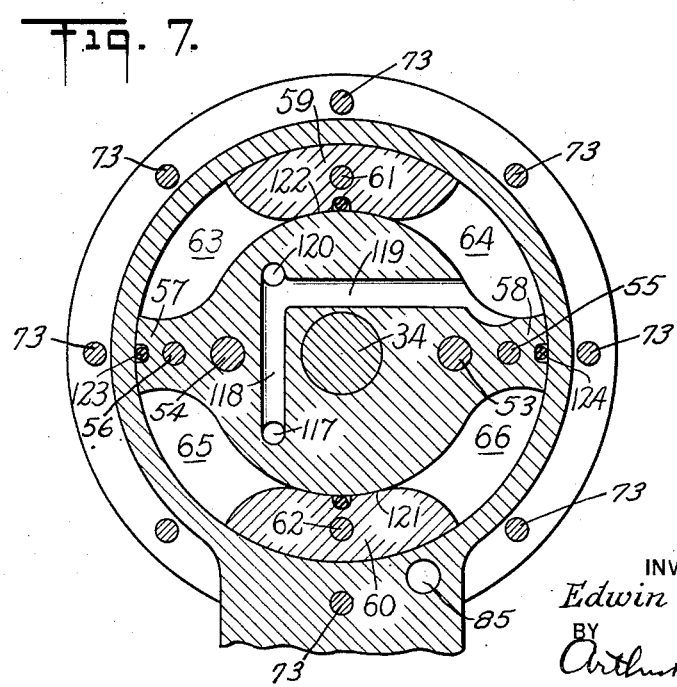
Fig. 7 is a vertical section on the line 7—7 of Fig. 3.
Figure 8:
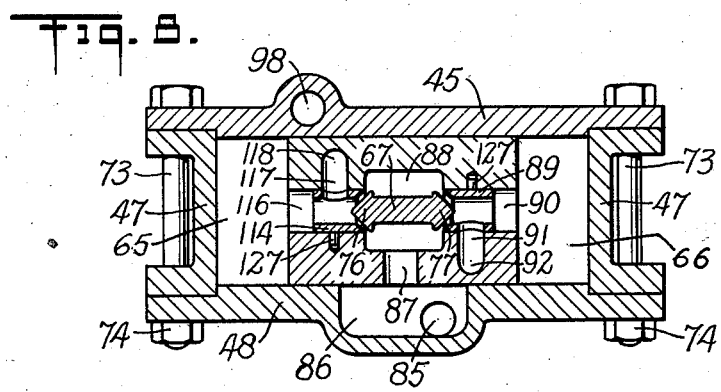
Fig. 8 is a horizontal section on the line 8—8 of Fig. 4.
Figure 9:
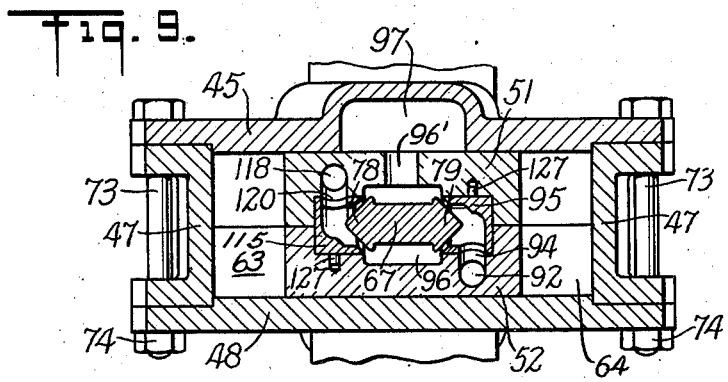
Fig. 9 is a horizontal section on the line 9—9 of Fig. 4.
Figure 10:
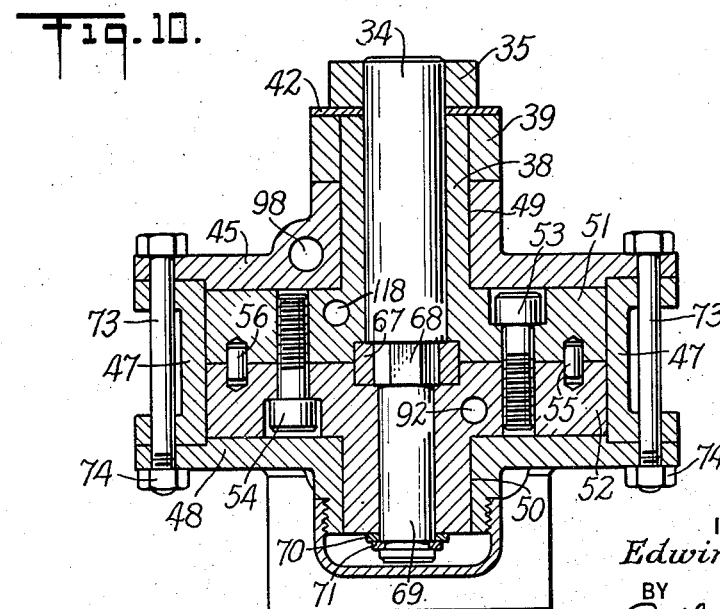
Fig. 10 is a longitudinal section on the line 10—10 of Fig. 1.

In the drawings, referring, first, to Figs. 1 to 14, I have shown two cables 1 and 2, which are preferably one continuous cable, connected to any desired manually movable control element (not shown) in the cockpit of an airplane. These two cables 1 and 2 are connected to bifurcated socket members 3 and 4, respectively, which are pivoted by means of pins 5 and 6 to the upper end of a lever 7. The lever 7 is pivotally connected by a bolt 8, having a nut 9, to a main lever 10. On the bolt 8 there is also a link 11, having sockets 12 and 13 which are connected, respectively, to cables 14 and 15 which lead to any desired part to be moved—as, for example, the rudder of an airplane. The cables 14 and 15 lead to the opposite sides of said rudder so they will respectively move the said rudder in the desired direction when operated manually from the cables 1 and 2. It will be understood, likewise, that cables 1 and 2 are operated simultaneously in the same direction. By pulling on the cable 1, this causes the part to be moved to operate in one direction, and a pull on the cable 2 will cause the part to be moved in the opposite direction, both cables being operable manually from a movable control element, which, in this particular instance, may be foot pedals (not shown) which are located in the airplane cockpit. It will, also, be noted that the cable 1, when actuated manually, will move the cable 15 partly manually and partly by power, the forces from both of which exert a movement in the same direction. Likewise, a pull on the cable 2 will, also, result in the partial manual power pull on the cable 14 in the opposite direction.

On the side of the lever 10 there is a centering device, normally keeping the manual control in middle position when not being actuated and restoring the manual control to middle position, comprising a boss 16 (see Figs. 2 and 13) on which is mounted, by means of a pivot 17, a link 18 through which passes a rod 19, having a head 20, secured within an ear 21 on the lever 10, the other end of which rod 19 has a nut 22 supported by a compression spring 23, one end of which rests against the side of the link 18. At the upper end of the link 18 there is a roller 24, supported by a fork consisting of arms 25 and 26, between which the roller 24 is pivotally supported upon a pivot 27, the pivot 27 having a rivet 27a passing through the roller supporting pivot 27 to keep said pivot in position. This roller 24 operates within an angular recess 28 carried by a projection 29 on the side of the lever 7. The said lever 7, below the pivot 8, has an arm 30 provided with a tooth 31 which extends into a recess 32 on a lever 33, which is keyed to a central shaft 34 and to which it is fastened by a split hub 35 having a bolt 36 fastened thereto and provided with a nut 37 (see Figs. 2 and 3).

This central shaft 34 is located within a sleeve shaft 38 on which the lever 10 is keyed and fastened by a split hub 39 having a bolt 40 with a nut 41 thereon. A washer 42 is located between the levers 33 and 10. As shown in Fig. 3, the lever 33 is fastened to its shaft 34 by a key 43, and the lever 10 is fastened to its hollow member 38 by a key 44. The shaft 34 and hollow member 38 are supported within an end plate 45 so as to pass through a chamber 46 within a casing 47 and then through a cover plate 48. The end plate 45 and the cover plate 48 are clamped to the casing 47 by bolts 73 secured by nuts 74. Referring to Fig. 3, the cover plate 45 is provided with a bearing 49, and the cover plate 48 is provided with a bearing 50 for the hollow member 38. The oscillating hollow member 38 has a flange member 51 and is located adjacent to a bored oscillating member 52, to facilitate the assembling of the valve control mechanism hereinafter described. The two members 51 and 52 are held together by a cap-screw 53, tapped into the part 52, and a cap-screw 54, tapped into the part 51 (see Fig. 10). The cap-screws may be held in position by lock washers. Suitable dowel pins 55 and 56 are provided so that the member parts 51 and 52 will always fit together in exactly the same position upon being taken apart and again reassembled.

Both of the members 51 and 52, which oscillate together with the oscillating member 38, are provided with vane-like projections 57 and 58 (see Figs. 4, 5 and 7), which fit accurately, but are free to move, within the inner surface of the wall 46 of the casing 47. Suitable partitions 59 and 60 are secured within the chamber by bolts 61 and 62 and dowel pins (not shown) to divide the chamber into chambers which may be called compartments 63, 64, 65, and 66.

The valve or fluid-controlling structure comprises a spider 67 accurately fitted over a hex portion 68 of the shaft 34, which shaft 34 from the hex portion 68 continues in smaller diameter to form a circular shaft 69 which is free to rock and has a bearing in the member 52, which in turn oscillates or rocks in the bearing 50 in the cover plate 48; whereas the shaft 34, previously described, oscillates or rocks in the hollow member 38, which in turn has a bearing 49 in the end plate 45. A retainer ring 70 is provided on the end of the shaft 69, which is held in place by a split ring 71 fitting into a groove on the shaft 69, the opposite end of shaft 69 being secured against lateral movement by the key 43 and the clamp member 35, with the cap-screw partly embedded in the shaft 34 at 72. The hollow member 38 is held in position by the key 44 and the cap-screw 40, which is partly embedded in the member 38 at 75, and the member 51 bearing against the cover plate 48. In the construction just described, lateral movement is prevented by the members 51 and 52, which are, however, free to rock or oscillate.

The spider 67 is provided with four poppet valves 76, 77, 78, and 79. These poppet valves are formed integral with the spider 67. The distributor poppet valves 76 and 77 operate to open or close the flow of the fluid circuit in the same direction that the fluid flows and are smaller in size than the reaction poppet valves 78 and 79, which operate to obstruct the flow of the fluid by opposing the flow and are larger in diameter than the poppet valves 76 and 77, to assist in causing the valves to return to the open or inactive position, thereby creating the pressure "feel." The poppet valves 77 and 78 must be fitted to seat simultaneously, and the poppet valves 76 and 79 likewise must be fitted to seat simultaneously. However, none of these valves is ever completely seated because the full volume of the pump must always be conveyed past both 77 and 78 or both 76 and 79, depending on the direction of the flow of the fluid. In order to obtain the desired pressure "feel," the latter is transmitted through the center of hollow member 38 by the shaft 34, the lever 33, and the arm 30 on the power actuator to the cables 1 and 2.

In order now to trace the circulation of the fluid through the power actuator or assistor, I provide a pair of pump gears 80 and 81, which gears have an inlet at 82 and an outlet at 83. The outlet 83 is connected to a passage 84, which in turn connects with a passage 85 to an arcuate-circle passage 86 (see Fig. 6). The passage 86 overlaps a passage 87, 88 (see Fig. 8) in the part 52, and the passage 87 also extends through part 51 against the end plate 45, which has a similar arcuate-circle space like 86, in order to equalize the pressure so that the parts 51 and 52 are free to oscillate without being clamped against the side walls or end walls due to any unbalanced reacting pressure. The reason for the arcuate-circle passage 86 is to provide a constant opening to the passage 87, regardless of the position of the oscillating parts 51 and 52.

In order to obtain smooth irregular passages like 86 and others, I provide a thin-walled steel tube and bend it into the required shape, after which it is secured in the mold and cast in place, using the proper casting material, which has a slightly lower melting point than the steel tube. This is well known by those skilled in the art.

The passage 87 connects to an opening 88 within the members 51 and 52, and on the right-hand side (see Fig. 4) connects with a valve seat member 89 for the valve 77, by a passage 90, to the compartment 66. This valve seat member 89 also has an opening 91 (see Figs. 5 and 8) which connects with a passage 92. The passage 92 connects by a passage 93 to the chamber 63 (see Fig. 5). The passage 92 also connects by a passage 94 to a valve seat member 95 for the valve 79, and, when valve 79 is open, to a passage 96. The passage 96 connects by a port 96' with an outlet circular passage 97 and a straight passage 98 in the end plate 45 to meet a passage 99 in a part of the casing 47. I have made the valve seat member 95 in the form of a separate thimble, with an annular flange, which fits in a groove in the parts 51 and 52.

The passage 99 connects by the passage 100 with the intake 82 of the pump. In the event the pump becomes inoperative for any reason, it is highly desirable that the power actuator may still be operated manually, and in order to do this it is necessary to permit the flow of the fluid from the passage 100 to the passage 84 without passing through the pump. In order to accomplish that, I have provided a passage 101, connecting with the passage 100, and a check valve 102, having a light spring 103 within a plug 104, which is tapped into an extension 105 forming a part of the casing 47. This acts as a one-way check valve.

I, further, provide a pressure relief valve 106, which consists of a plunger 107 held in position on a seat 108 by a spring 109 and adjustable by a set screw 110 which is secured by a jam nut 111. The plunger 107 closes a passage 112 which connects with a passage 113, that in turn connects with the passage 84. This will prevent excessive pressures by releasing such pressure to the intake side of the pump 80, 81.

To drive the pump, I have provided a shaft 134, connected to the pump gear 81, and a frame 135 which is intended to support an electric motor, the construction of which is fully disclosed in my earlier patents, and particularly in the Patent No. 2,095,841 aforesaid, which likewise describes a pump in more specific language, although the pump construction is no part of my present invention since, obviously, the pump need not be a part of this power unit, but may be placed remotely from this actuator and connected by outlet and inlet conduits therewith.

I have just described the flow of the circuit through the passages to actuate the oscillating vanes 57 and 58 in a counterclockwise direction when the pull is exerted on the cable 2 (see Figs. 2 and 4), which is accomplished by rocking the hex shaft 68 in an opposite direction to that obtained by the pull on the cable 2, partly closing off the circulation of the fluid passing between the valve 76 and the valve seat member 114, and opening the valve 77 for the free admission of fluid into the chamber 66, through the passages 92 and 93, into the chamber 63, thereby exerting pressure on the upper side of member 57 and on the under side of the member 58 and thus counterbalancing the pressure without causing any binding. In order to accomplish the clockwise motion of the vanes 57 and 58, shown in Fig. 4, I provide a valve seat member 114 for the valve 76, and a valve seat member 115 for the valve 78. The valve seat member 114 is connected by a passage 116 to the compartment 65. Valve seat member 114 also has an opening 117 which connects to a passage 118 and thence to a passage 119 that connects with the compartment 64 (see Fig. 7).

There is a further passage connection 120 to the valve seat 115. The construction just described permits the fluid, when the spider on the hexagon shaft 68 is rocked counterclockwise, to close off the passage 90 and check the flow of the fluid between the valve seat member 89 and the valve 77, and open wider the space between the valve seat member 114 and valve 76 to permit more fluid to freely flow into chamber 65, through passage 116, and also out of the passage 117 in the valve seat member 114, through passage 118 and the passage 119, into compartment 64.

Pressure is controlled by continuation of the flow through passage 120 into the valve seat member 115, which is controlled by the valve 78, so that, being an integral part of the spider 67 and rocked counterclockwise, the valve 78 acts to restrict the flow of the fluid from the valve seat member 115 to the return passage 96 and builds up a fluid pressure in proportion to the pull on the cable 1.

As pressure is progressively increased, depending upon the degree of manual effort on the cable 1, the pressure is built up in the compartment 64 and compartment 65, which are connected to each other by the passages 116, 117, 118, and 119. Since the pump operates continuously, and since all of these passages are filled with fluid at all times, the response is instantaneous, so the surplus fluid must be permitted to flow out through the return passage 96, but, since it is restricted by valve 78 and, of course, by the closing of valve 77 on the valve seat member 89, the degree of pressure of the valve 78 towards the valve seat member 115 determines the degree of fluid pressure in the compartment 64 and the compartment 65.

Since the partitions 59 and 60 fit the cylindrical surfaces 121 and 122 of the parts 51 and 52, these are practically oil-tight surfaces, and only a very small amount of seepage can pass from the compartment 63 into the compartment 64, and likewise from the compartment 65 to the compartment 66, or vice versa.

Suitable seals 123 and 124 are provided on the vanes 57 and 58, obviously to prevent unnecessary leakage. Some leakage may occur, however, depending, of course, upon the capacity of the pump, because of this being a so-called "cruising circuit," in which the fluid must continue to flow even though the pressures of 1,500 pounds per square inch may be obtained in the fluid, which will, obviously, change its speed of flow at these high pressures, because substantially the same amount of fluid flows through a smaller orifice at a much greater velocity than where the opening is larger.

Since the openings in the valve seat members must register with the respective passages, I cut a notch 125 in the flange 126, at some point opposite the passage opening, and this notch fits over a pin 127 secured in the bottom of the groove in the proper position. (See Fig. 14.)

In the operation of my invention, referring to Figs. 1 to 14, when no pressure is desired, in either direction, the fluid flows from the pump gears 80 and 81 through the outlet 83 and passage 84 (see Fig. 4), then through passages 85, 86, 87 (see Figs. 3 and 6) into the passage 88. From there the fluid is divided. One half thereof flows past the valve 77 and the valve seat member 89 into the opening 91 and passages 92, 94 (see Figs. 5 and 9) into the valve seat 95 past the valve 79 into the space 96 and out through the opening 96' into the channel 97, 98, 99, 100 (see Figs. 4, 6 and 9) then by the inlet 82 to the pump 80, 81. The other half from the passage 88 flows past the valve 76 and into the valve seat member 114 into the passages 117 and 118 (see Fig. 7) through the passage 120 past the valve seat 115 past the valve 78 into the space 96 (see Fig. 9) and thence out through the port 96' into the channel 97, 98, 99, 100 to the pump inlet 82. During this operation, it is clear that no pressure is set up in the chambers 63, 64, 65, 66, and, therefore, no movement of the vanes 57 and 58 takes place. It is obvious that when the flow of fluid of either group of passages is restricted without restricting the other, that the side of the vanes acted upon by the restricted pressure must respond by moving, provided the pressure is finally increased to a point where resistance of the load or work to be performed is less than the force applied. When clockwise motion of the vanes 57, 58 is desired, the fluid flow is restricted by movement of the valve 77 against the valve seat member 89 and the restriction of the exhaust past the valve 78 and the valve seat member 115, which permits unobstructed flow past the valve 76 and the valve seat member 114 through the passage 116 into the chamber 65 and through the passages 117, 118 and 120 through the passage 119 into the chamber 64 (see Fig. 7). The closing of the valve 77 against the valve seat member 89 prevents pressure from entering the chamber 66 through the passage 90 and the fluid from chamber 66 is permitted to exhaust through the passages 90, 91 and 92, and out through the passage 94 (see Figs. 4 and 5) past the valve 79 and the valve seat member 95 into the passage 96 and out through the port 96' and the passage 97. During this motion the fluid in the chamber 63 is permitted to pass out through passage 93 and the passage 94.

When counterclockwise motion of the vanes 57, 58 is desired (see Fig. 4) the reverse action of the control levers 7 causes the valve 76 to close and restricts the flow of the fluid from the pressure passage 87 past the valve seat member 114 due to reverse motion mechanism and also closes the exhaust valve 79 against the valve seat member 95. This action prevents pressure from entering the passage 116 or 117 but permits the exhaust from the chamber 65 to pass out through the passage 116, 117, 118, 120 past the valve 78 and the valve seat member 115 into the chamber 96 and thence out through the port 96' and the passage 97. The exhaust from the chamber 64 passes out through the passage 119 and out through the passage 120 (see Fig. 7). As pressure is built up due to the closing of the valve 76 against the valve seat member 114, the degree of pressure on the reverse motion control mechanism determines the degree of pressure. The pressure liquid flows in from the passage 87 to the space 88, past the valve 77 and the valve seat member 89 and, being obstructed by the closing of the exhaust valve 79 against the valve seat member 95, then flows into the passage 90 and the chamber 66 to exert pressure against the vane 58. At the same time the pressure liquid flows into the opening 91 and the passages 92, 93 into the chamber 63 (see Fig. 5) to exert pressure against the vane 57, because the outlet through the passage 94 is closed by valve 79 (see Figs. 4 and 5).

Figure 29:
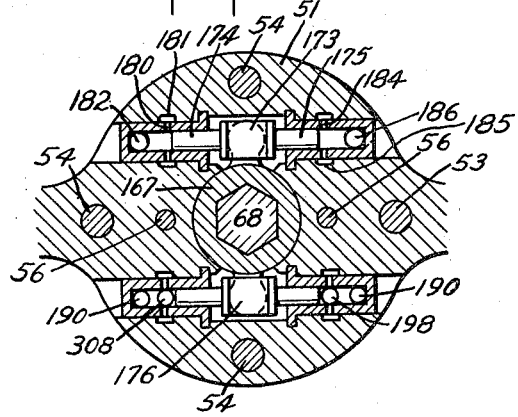
Fig. 29 shows a view like Fig. 19, but with all the ports being capable of being uncovered simultaneously for use as a continuously cruising circuit like that required in Fig. 4.

In Fig. 29 I have shown piston valves which are adapted to operate the same as the hereindescribed poppet valves and where a continuous flow or cruising circuit is used.

I shall now describe the slight alterations which are necessary to convert my double-acting power amplifier from the above described cruising circuit unit to one operated by static pressure (see Figs. 15 to 28). I accomplish this by cutting off the shaft 69, close to the hex surface 68, and holding the same in place by a washer 170, which in turn is secured in position by a split ring 171 fitting into a groove 172 on the shaft 34. On the hex portion 68 I mount a double arm 167, provided with a fork 168 on one end and a fork 169 on the opposite end. The fork 168 fits over a flat surface 173 and bears against flanges which are a part of piston valves 174 and 175. The opposite fork of the double arm 167 likewise straddles a flat portion 176 and bears against similar flanges which are a part of piston valves 177 and 178. The piston valve 174 is provided with a sleeve member 179 having ports 180 communicating with an annular space 181. The fluid intake into the sleeve member 179 is through an opening 182, whereby the fluid presses against the end of the piston 174. The piston 175 is provided with a sleeve member 183 and has radial ports 184 which connect with the annular space 185, and the fluid reaches the end of the piston 175 through an opening 186, thus counterbalancing the pressure against the end of the piston 174 when in the position shown in Fig. 19, and closing both exhaust ports 180 and 184. The piston 177, controlling one side of the inlet passage, has a sleeve member 187 and is provided with radial ports 188 which connect with an annular space 189, which in turn is supplied with fluid through a port 190. The piston 178, controlling the other side of the inlet passage, is provided with a sleeve member 191 having radial ports 192 connecting with an annular space 193. The fluid is supplied within the sleeve member 191 by the same passage 190 (see Fig. 24). The passage 190 is connected by a passage 194 with an intake passage 195. The passage 195 is connected to any suitable source of static pressure (see Fig. 21).

Figure 19:
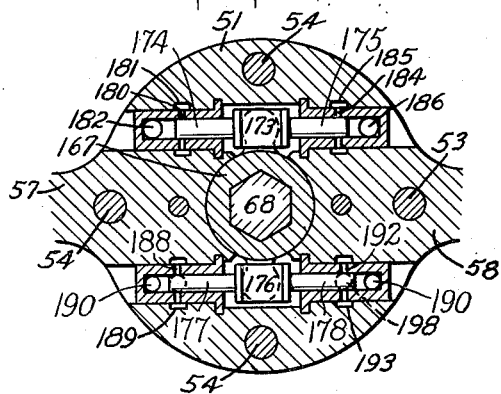
Fig. 19 is a vertical section of the piston valves of Fig. 16 in neutral position, that is, when the static pressure is sealed off by closing the ports on both sides of the inlet and also when the outlet ports are closed by the position of the piston valve.

Referring to Fig. 19, the position of the pistons 177 and 178 is such that they cover the ports 188 and 192, with the static pressure balancing the ends of the pistons and closing off the flow of the fluid to the same.

Figure 17:
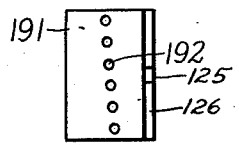
Fig. 17 shows a development in plan of the lower valve ports.

In order to prevent a quick opening for the fluid inlet through the ports 188 and 192, the said ports are made up of a series of small holes drilled on a slight spiral, as is shown in Fig. 17. The purpose of this is so that as the valve moves into a position to uncover the port to obtain pressure to move the vanes, only a small part of the first opening is uncovered at first and the following openings are uncovered progressively thereafter, so that the piston has to travel the entire stroke before all of the ports are uncovered. This is necessary in order to obtain a gradual and smooth application of power.

Figure 18:
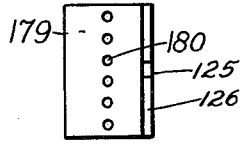
Fig. 18 shows a development in plan of the upper valve ports.

Fig. 18 shows the development of the ports 180 and 184, which, because the opening controls the exhaust or outlet side, are all in line for quick exhaust.

When the valves 177 and 178 are in the position shown in Fig. 16, the pressure enters through the passage 195, arcuate passage 209 and passage 194 connected with the passage 190 (see Figs. 15-21). Because the ports 188 are uncovered by the piston 177 the pressure liquid flows out through the ports 188 into the annular space 189 and into a passage 308. The passage 308 connects with a passage 309 (see Fig. 22) which in turn connects with the chamber 65 to provide pressure on the under side of the vane 57 and also connects with the chamber 64 to provide pressure on the upper side of the vane 58, thereby producing a clockwise motion.

Simultaneously, the piston 175 will have uncovered the ports 184 as in Fig. 16, allowing the fluid in the camber 63 to exhaust through a passage 201 out through the opening 186 and through the ports 184 into the annular space 185, thence out through a passage 203 into passages 204, 205, 208, 206 and 207, 213 (see Figs. 19, 25 and 28). The underside of the vane 58 exhausts through passages 199, 200 and 186 (see Fig. 23), then follows the same exhaust course as for the vane 57.

Figure 20:
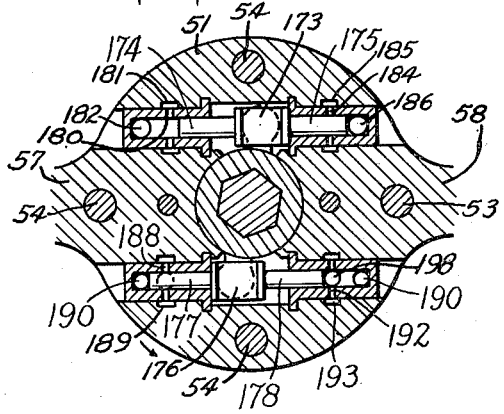
Fig. 20 is a vertical section showing the piston valves in the extreme position opposite to that shown in Fig. 16.
Figure 21:
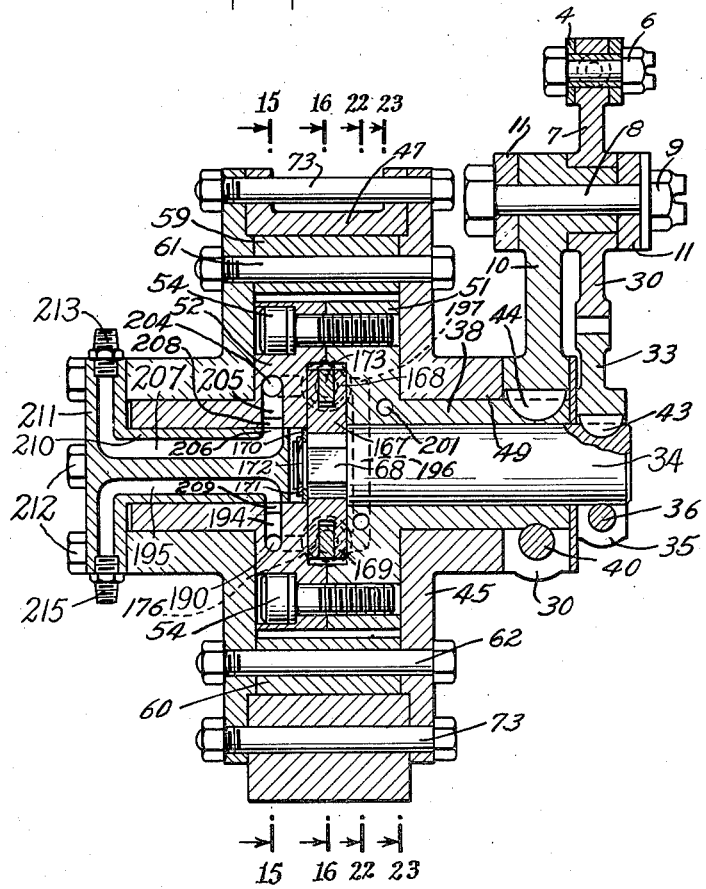
Fig. 21 is a vertical section on the line 21—21 of Fig. 16.

Referring, now, to Fig. 20, the piston valves are shown in the opposite position from that of Fig. 16. The piston 178 uncovers the ports 192 which connects to the annular space 193, which in turn is connected by a passage 198 that connects with passages 199 and 200 and the passage 201 to the upper side of the vane 57 on the left-hand side, and the lower side of the vane 58 on the right-hand side (see Fig. 23), causing anticlockwise motion. The passage 200 also connects to the passage 186. The piston 175, being in the extreme right-hand position, cuts off the port 184, and the pressure through the passage 186 reacts on the end of the piston 175 to provide the necessary pressure "feel." The annular space 181 connects with a passage 202, and the annular space 185 connects with the passage 203. The passages (see Fig. 25) 202 and 203 are connected to each other by the passage 204 and by the passage 205, through the short passage 206, into the return outlet passage 207. Suitable 90° relief space 208 is provided so that as the vanes oscillate, free opening space will always be obtained to the passage 206 from the passage 205. A similar 90° relief space is provided at 209 to maintain a continuous opening of the passage 195 with that of 194 (see Fig. 15). The inlet passage 195 and the outlet passage 207 are provided in an annular member 210. This member is integral with a flange 211 which is secured to the hub member 48 by suitable bolts 212. An inlet nipple 215 (see Fig. 21) is provided and an outlet nipple 213 is also provided. To provide for the exhaust from the chambers 65 and 64 for the anticlockwise movement of the vanes 57 and 58, the piston 174 has uncovered the ports 180. Therefore, the exhaust (see Fig. 22) flows into the passage 309 up through the passageway 196 and out through the opening 182 through the ports 180, into the annular space 181 into the passages 202 (see Fig. 15), 204, 205, 206, and out through the passage 207.

The operation of my power amplifier in Figs. 15 to 28 is as follows: Referring to Fig. 16, assuming that the pistons 177 and 178 are in the position shown, the fluid pressure comes in through the passages 195, 194 and 190 (see Figs. 15, 21 and 24), connecting with the annular space 189 through the ports 188 which are uncovered by the movement of the piston 177, and then out through the annular space 189 through the passage 308 (see Fig. 22) and the passage 309 which permits pressure to be exerted on the lower left-hand side of the vane 57 and on the upper right-hand side of the vane 58. The fluid also flows up through the passage 196 into opening 197, coming out of the passage 182 and against the piston 174 which has cut off the outlet through the ports 180 to the annular space 181, which is connected to passages 202, 204, 205 and 206 and the outlet 207 (see Figs. 15 and 25).

While this pressure is being exerted clockwise on the vanes 57 and 58 (see Fig. 16), it is obvious that the fluid on the opposite side of the vanes must be exhausted. It will be noted that the piston 175 has uncovered the ports 184 and the annular space 185, which connects (see Fig. 25) with the passages 203, 204, 205, 206 and 207 and, therefore, provides a free outlet for the fluid which enters at 186. The passage 186 also connects with the passages 201, 200, 199 and 198, which in turn connect with the annular space 193 (see Fig. 24) and the ports 192 that are closed off by the valve 178 so that the fluid is forced to flow through the passages hereinbefore mentioned (see Fig. 23), exhausting the lower right-hand chamber 66, through passages 199, 200 and 186, and the upper left-hand chamber 63, through passages 201 and 186, as the vanes move in a clockwise direction.

Figure 23:
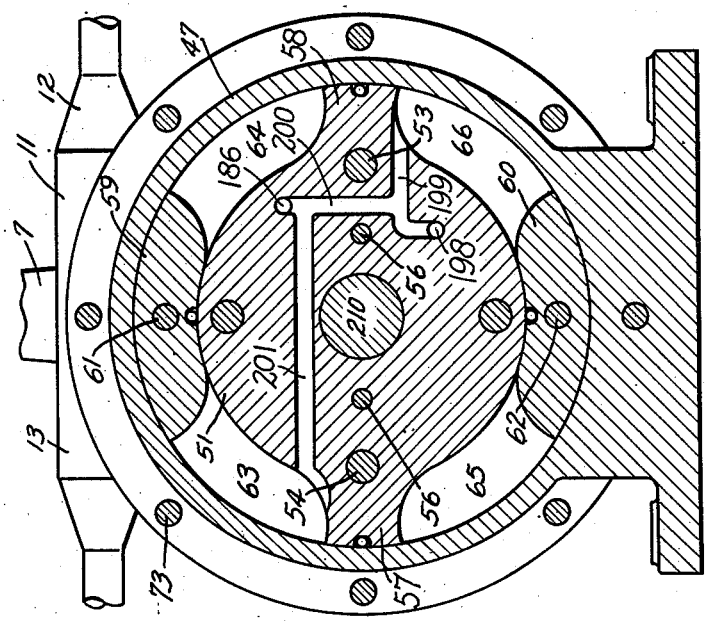
Fig. 23 is a vertical section on the line 23—23 of Fig. 21.
Figure 22:
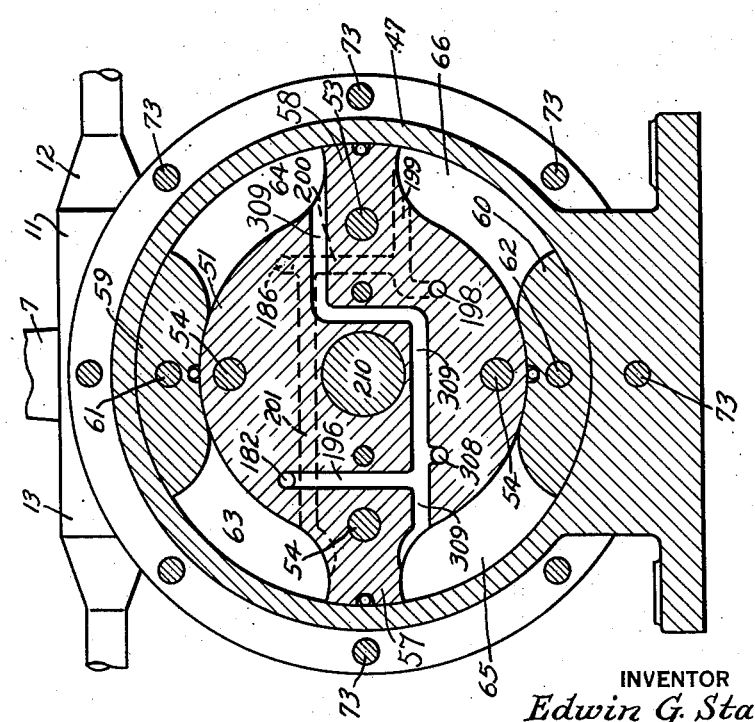
Fig. 22 is a vertical section on the line 22—22 of Fig. 21.
Figure 31:
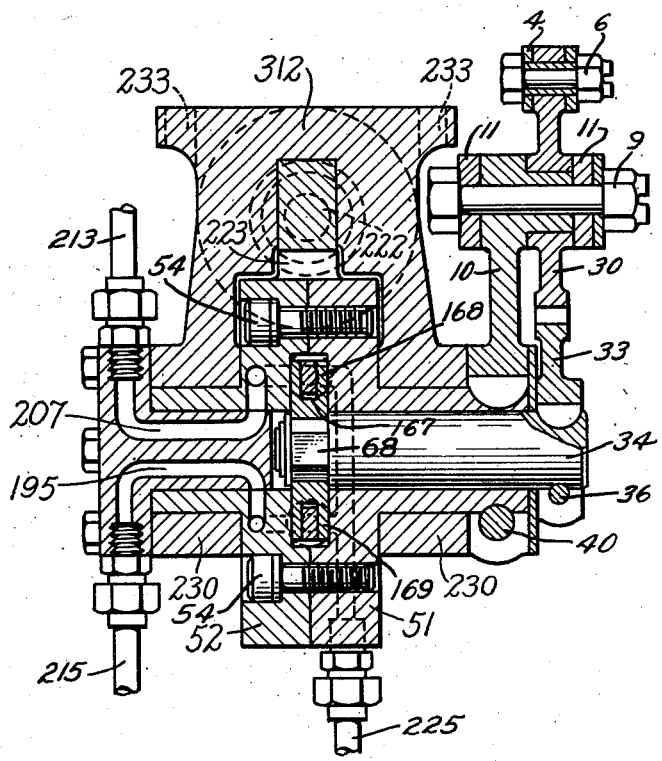
Fig. 31 is a vertical section on the line 31—31 of Fig. 30.

For motion in the opposite direction, the flow of the fluid in Fig. 20 follows the passages shown in Fig. 23—that is the ports 192 are uncovered and fluid pressure flowing through the passage 199 enters the annular space 193 and flows into the passages 198, 199, 200, 201 and connects with 186, and acts against the end of the piston 175 which has closed off the ports 184 to prevent exhaust.

With the piston valves in position shown in Fig. 19, it is obvious that the intake sides of the pressure on both ends of the pistons are closed off from ports 188 and 192, and no fluid can flow through the system. At the same time, to prevent the escape or exhaust of the fluid on the outlet side, the piston valves 174 and 175 close off the ports 180 and 184 leading to the annular space 181 and 185. This means the positions of the vanes are locked against movement in either direction, regardless of the pressure exerted to cause movement, which is also an important feature of my invention.

In the drawings I have shown the diameter of the pistons 174 and 175 as slightly larger than pistons 177 and 178, the purpose of which is to have a larger outlet space in order to maintain quick exhaust action. Another reason for the increase in diameter of the pistons 174 and 175 is to obtain a greater area on the ends of the pistons to get sufficient pressure reaction on the controlling cables 1 and 2. The pistons 174 and 175 also may be made slightly shorter in order to uncover the exhaust ports slightly in advance of the pistons 177 and 178 for the intake ports.

As shown in Fig. 29, by making all four pistons short enough so that when in position shown in Fig. 29 the piston valves will uncover all of the ports, the valves will then operate on a continuous or cruising circuit, and, because of this simple alteration, the piston valve type, since it is so easily kept oil-tight and free from leakage, is my preferred form.

In the absence of any fluid pressure, the piston flanges will strike the sleeve members at the end of the short piston stroke, and then the vanes may be moved manually by pulling on the cable 1 or 2.

In Figs. 30 to 33 I have shown the application of my power amplifier applied to a cylinder and piston pressure control, as in Figs. 15 to 29, but dispensing with the vanes 57 and 58. The added parts here are as follows: Cylinders 218 and 219 are provided, within which a pair of pistons 220, 221 operate. These pistons are connected by a member 222, which is provided with a gear rack 223 that meshes into a gear sector 224 on the members 51 and 52. Suitable flexible, metallic hose 225 and 226 connect the cylinders 218 and 219 with the pressure and exhaust passages 308 and 198, respectively.

Because pressure is required only on one side of each of the pistons 220 and 221, the fluid passages in the members 51, 52 are simplified, as shown in Fig. 32. The flexible hose 226 connects with the passage from the pressure inlet 308 and exhausts through the exhaust outlet passage 197, while the flexible hose 225 connects with the pressure inlet passage 198 and to the exhaust passage 186.

Referring to Fig. 33, the oscillating members 51 and 52 are mounted in a member 229 by a pair of caps 230 (see Figs. 31 and 33) secured by two cap screws 231 and 232 to the member 229, which may be supplied with flanges 233 at the top for securing the same with suitable cap screws to any supporting means. The same reference numbers apply to both sides which, with the caps 230, form the bearings for the hollow member 38 on the member 51 and a similar hollow bearing in the member 52. With the construction shown in Fig. 33 I provide the same valve structure as shown in Fig. 16. In the operation of this form of my power amplifier, by pulling on the cable 1, the fluid under pressure supplied to the port 190 from the inlet 215 (see Fig. 21) will emerge from the passage 308, while the passage 197 is closed off by the plunger 174, and travel through the flexible hose 226 against the piston 221 within the cylinder 219 and thus cause the same to move to the right, during which the fluid in the cylinder 218 can exhaust through the passages 183, 186, 203, 204, 205, 206, 207 to the outlet 213. Likewise, by pulling on the cable 2 the fluid under pressure will emerge from the passage 198 and pass through the flexible hose 225 against the piston 220 in the cylinder 218, since the passage 186 is closed off by the plunger 175, and the pressure will continue to force the piston 220 to the left as the passage 308 is open while exhausting the fluid in the cylinder 219 through the passages 308 and 181, 197, 202, 204, 205, 206, 207 to the outlet 213. As will be seen from Figs. 30 and 32, a movement of the piston 220, 221 to the right or left by means of the rack 223 and gear 224 connection with the members 51 and 52, will act to assist in the movement of the oscillating members 51 and 52 for the purpose hereinbefore described. It is, of course, obvious to anyone skilled in the art that the size of the pistons 220, 221 and the pressure per square inch thereon, will determine the amount of assistance which the pistons will apply to the oscillating members 51 and 52.

To apply the amplifier for direct attachment to a steering wheel of an automobile, the steering arm on the end of the steering shaft is merely connected directly to the control arm 7, instead of to the cables 1 and 2, and the usual radius rod is then connected to the arm 10.

Suitable plugs (not shown) may be provided near the upper end of each compartment 63 and 64 to bleed out any air when first filling the unit with fluid.

It will be apparent to those skilled in the art that the embodiments herein described may be variously changed and modified without departing from the spirit of my invention and that the invention is capable of uses and has advantages not specifically described herein. As an illustration, the intake and outlet of the fluid circuit shown in Fig. 21 may be substituted for the intake and outlet of the fluid circuit shown in Figs. 8 and 9. It will, therefore, be understood that my invention is not strictly limited to the precise construction given. Also, inasmuch as the structure in Figs. 15 to 33 operates with static pressure, it is especially adapted for operation by high air pressures or alternatively with liquid pressures. Accordingly, my invention is not limited to the specific pressure agent utilized.

I claim:

1. A double acting fluid power amplifier having a connection for a source of fluid pressure, a plurality of compartments, movable walls therein and which are connected to be moved together by said fluid pressure, a member for connecting said walls to a work performing element, passages leading from the source of fluid pressure to said walls, plural valves in said passages, comprising means to distribute the flow for directional operation and to react to the pressure applied thereby, for controlling the application of said fluid pressure to each of said walls by obstructing the movement of the fluid in certain of said passages and controlling the pressure acting against and being exhausted from the walls to cause movement of said walls in the direction desired and manually operable means including a reversible valve-operating mechanism operable in either direction from an initial inactive position for operating said valves and controlling the application of said fluid pressure to said movable walls to accord with said means.

2. A double-acting liquid power amplifier having a connection for a source of liquid pressure, a chamber having partitions dividing it into a plurality of compartments, movable walls therein and which are connected to be moved together by said liquid pressure, a member for connecting said walls to a work performing element, passages leading from the source of liquid pressure to said walls, plural valves in said passages, comprising means to distribute the flow for directional operation and to react to the pressure applied thereby, for controlling the application of said liquid pressure to each of said walls by obstructing the movement of the liquid in certain of said passages and controlling the pressure acting against and being exhausted from the walls to cause movement of said walls in the direction desired and manually operable means including a reversible valve-operating mechanism operable in either direction from an initial inactive position for operating said valves and controlling the application of said pressure to said movable walls to accord with said means.

3. A double acting fluid power amplifier having a connection for a source of fluid pressure, a plurality of compartments, rotary arms therein and which are connected to be moved together by said fluid pressure, a member for connecting said arms to a work performing element, passages leading from the source of fluid pressure to said arms, plural valves in said passages, comprising means to distribute the flow for directional operation and to react to the pressure applied thereby, for controlling the application of said fluid pressure to each of said arms by obstructing the movement of the fluid in certain of said passages and controlling the pressure acting against and being exhausted from the arms to cause movement of said arms in the direction desired and manually operable means including a reversible valve-operating mechanism operable in either direction from an initial inactive position for operating said valves and controlling the application of said fluid pressure to said movable walls to accord with said means.

4. A double acting fluid power amplifier having a connection for a source of fluid pressure, a plurality of compartments, rotary arms therein and which are connected to be moved together by said fluid pressure, a member for connecting said arms to a work performing element, passages leading from the source of fluid pressure to both sides of each of said arms, plural valves in said passages, comprising means to distribute the flow for directional operation and to react to the pressure applied thereby, for controlling the application of said fluid pressure to each of said arms by obstructing the movement of the fluid in certain of said passages and controlling the pressure acting against and being exhausted from the arms to cause movement of said arms in the direction desired and manually operable means including a reversible valve-operating mechanism operable in either direction from an initial inactive position for operating said valves and controlling the application of said fluid pressure to said movable walls to accord with said means.

5. A double acting fluid power amplifier having a connection for a source of fluid pressure, a plurality of compartments, rotary arms therein and which are connected together by means of a common hub and arranged to be moved together by said fluid pressure, a member for connecting said arms to a work performing element, passages leading from the source of fluid pressure to both sides of each of said arms, plural valves in said passages, comprising means to distribute the flow for directional operation and to react to the pressure applied thereby, for controlling the application of said pressure to each of said arms by obstructing the movement of the fluid in certain of said passages and controlling the pressure acting against and being exhausted from the arms to cause movement of said arms in the direction desired and manually operable means including a reversible valve-operating mechanism operable in either direction from an initial inactive position for operating said valves and controlling the application of said fluid pressure to accord with said means.

6. A double acting fluid power amplifier having a connection for a source of fluid pressure, a plurality of compartments, rotary arms therein and which are connected together by means of a common hub and arranged to be moved together by said fluid pressure, a sleeve for connecting said arms to a work performing element, passages leading from the source of fluid pressure to both sides of each of said arms, plural valves in said passages, comprising means to distribute the flow for directional operation and to react to the pressure applied thereby, for controlling the application of said fluid pressure to each of said arms by obstructing the movement of the fluid in certain of said passages and controlling the pressure acting against and being exhausted from the arms to cause movement of said arms in the direction desired and manually operable means including a reversible valve-operating mechanism, a shaft in said sleeve and operable in either direction from an initial inactive position for operating said valves and controlling the application of said fluid pressure to accord with said means.

7. A double acting fluid power amplifier having a connection for a source of fluid pressure, comprising a pump for circulating liquid, a plurality of compartments, movable walls therein and which are connected to be moved together by said fluid pressure, a member for connecting said walls to a work performing element, passages leading from the source of fluid pressure to said walls and passages for leading the liquid back to the pump, plural valves in said passages, comprising means to distribute the flow for directional operation and to react to the pressure applied thereby, for controlling the application of said fluid pressure to each of said walls by obstructing the movement of the liquid in certain of said passages and controlling the pressure acting against and being exhausted from the walls to cause movement of said walls in the direction desired and manually operable means including a reversible valve-operating mechanism operable in either direction from an initial inactive position for operating said valves and controlling the application of said fluid pressure to said movable walls to accord with said means.

8. A double acting fluid power amplifier having a connection for a source of static fluid pressure, a plurality of compartments, movable walls therein and which are connected to be moved together by said fluid pressure, a member for connecting said walls to a work performing element, passages leading from the source of fluid pressure to said walls, plural piston valves in said passages, comprising means to distribute the flow for directional operation and to react to the pressure applied thereby, for controlling the application of said fluid pressure to each of said walls by obstructing the movement of the fluid in certain of said passages and controlling the pressure acting against and being exhausted from the walls to cause movement of said walls in the direction desired and manually operable means including a reversible valve-operating mechanism operable in either direction from an initial inactive position for operating said valves and controlling the application of said fluid pressure to said movable walls to accord with said means.

9. A double acting fluid power amplifier having a connection for a source of fluid pressure, comprising a pump for circulating liquid, a plurality of compartments, movable walls therein and which are connected to be moved together by said fluid pressure, a member for connecting said walls to a work performing element, passages leading from the source of fluid pressure to said walls and passages for leading the liquid back to the pump, plural, simultaneously operable, piston valves in said passages, comprising means to distribute the flow for directional operation and to react to the pressure applied thereby, for controlling the application of said fluid pressure to each of said walls by obstructing the movement of the liquid in certain of said passages and controlling the pressure acting against and being exhausted from the walls to cause movement of said walls in the direction desired and manually operable means including a reversible valve-operating mechanism operable in either direction from an initial inactive position for operating said valves and controlling the application of said fluid pressure to said movable walls to accord with said means.

10. A double acting fluid power amplifier having a connection for a source of fluid pressure derived from a pump, a fluid circuit, a chamber, fixed partitions within said chamber to divide said chamber into compartments, vanes in said compartments connected to a common hub having sleeves with bearings in the side walls of said chamber, one of said sleeves being for connection to a work performing element, passages leading from the output passage of the pump to both sides of said vanes and back to the input side of said pump, plural valves for restricting the flow in certain of said passages and controlling the pressure acting against both vanes to counterbalance at least partly said pressures on each vane and to cause movement of said vanes in the direction desired, and manually operable means including a reverse motion mechanism operable in either direction from an initial inactive position for operating said valves and controlling the application of said fluid pressure to said vanes and the exhaust therefrom.

11. A double acting fluid power amplifier having a connection for a source of fluid pressure, a plurality of chambers provided with oscillating vanes therein, a hub formed integral with said vanes, intake fluid passages located within said hub leading from said source and connecting with both sides of said vanes, outlet passages within said hub leading from said source, said vane chambers and said intake and outlet passages being connected with each other, plural piston valves for controlling said fluid pressure between the intake and the outlet passages, said plural piston valves being mounted for pressure reaction from the fluid pressure admitted against certain of the ends of said piston valves so as to obtain a pressure feel proportionate to the power applied, and manually operable means including a reverse motion valve-actuating mechanism for operating said plural valves.

12. A double acting fluid power amplifier having a connection for a source of fluid pressure, a plurality of chambers provided with oscillating vanes therein, a hub to which said vanes are secured, fluid inlet and outlet passages within said hub connecting the source of fluid pressure with both sides of said vanes, plural valves within said hub for controlling the application of said pressure fluid to said vanes, as well as the exhaust therefrom, and manually operable means including a reverse motion valve-actuating mechanism for operating said plural valves.

13. A double acting fluid power amplifier having a connection for a source of fluid pressure, a plurality of chambers provided with oscillating vanes therein, a hub to which said vanes are secured, a sleeve for supporting said hub, inlet and outlet fluid passages located in said hub, fluid passages within said hub connecting said inlet and outlet fluid passages and said vane chambers, plural piston valves within said hub for controlling the application of fluid flowing through said passages to, as well as the exhaust from, said vanes, and manually operable means including a reverse motion valve-actuating mechanism for operating said piston valves.

14. A double acting fluid power amplifier having a connection for a source of fluid pressure, a plurality of chambers provided with oscillating vanes therein, a hub to which said vanes are secured, sleeves for supporting said hub, inlet and outlet fluid passages located in said hub, fluid passages within said hub connecting said inlet and outlet fluid passages and said vane chambers, plural piston valves within said hub for controlling the application of fluid flowing through said passages to, as well as the exhaust from, said vanes, and manually operable means including a reverse motion valve-actuating mechanism connected concentrically through one of said sleeves for operating said piston valves and thereby controlling the flow of said fluid to said vanes and the exhaust therefrom.

15. A double acting fluid power amplifier having a connection for a source of fluid pressure, a plurality of chambers provided with oscillating vanes therein, a hub to which said vanes are secured, a sleeve for supporting said hub, inlet and outlet fluid passages located in said hub, fluid passages within said hub connecting said inlet and outlet fluid passages and said vane chambers, plural piston valves within said hub having a mounting arranged so as to be movable in opposition to the fluid pressure for controlling the fluid flowing through said passages, and manual means for controlling said piston valves.

16. A double acting fluid power amplifier having a connection for a source of fluid pressure, a plurality of chambers provided with oscillating vanes therein, a hub to which said vanes are secured, bearing sleeves formed integrally with a portion of said hub, one of said sleeves having a power output arm connected thereto, inlet and outlet fluid passages located substantially concentric with one of said bearing sleeves, fluid passages within said hub connecting said inlet and outlet fluid passages and said vane chambers, plural piston vanes located within said hub having a mounting arranged so as to be movable in opposition to the fluid pressure for controlling fluid flowing through said passages, one or more of said piston valves being arranged to urge the continuous closing off of the movement of said fluid by said plural pistons, and manual means for controlling said piston valves.

17. A double acting fluid power amplifier having a connection for a source of fluid pressure, a plurality of chambers provided with oscillating vanes therein, a hub to which said vanes are secured, bearing sleeves formed integrally with a portion of said hub, one of said sleeves having a power output arm connected thereto, inlet and outlet fluid passages located substantially concentric with one of said bearing sleeves, fluid passages within said hub connecting said inlet and outlet fluid passages and said vane chambers, a pair of piston valves formed integral with each other and located within said hub having a mounting arranged so as to be movable in opposition to the fluid pressure for controlling the inlet of said fluid under pressure, a second pair of piston valves formed integrally with each other and located within said hub having a mounting arranged so as to be movable in opposition to the fluid pressure for controlling the fluid outlet from said passages within said hub and manual means for controlling said piston valves.

18. A double acting fluid power amplifier having a connection for a source of fluid pressure, a plurality of chambers provided with oscillating vanes therein, a hub to which said vanes are secured, bearing sleeves formed integrally with a portion of said hub, one of said sleeves having a power output arm connected thereto, inlet and outlet fluid passages located substantially concentric with one of said bearing sleeves, fluid passages within said hub connecting said inlet and outlet fluid passages and said vane chambers, a pair of piston valves formed integrally with each other and located within said hub having a mounting arranged so as to be movable in opposition to the fluid pressure for controlling the inlet of said fluid under pressure and having a valve-operating flange, a second pair of piston valves formed integrally with each other and located within said hub having a mounting arranged so as to be movable in opposition to the fluid pressure for controlling the fluid outlet from said passages within said hub and having a valve-operating flange, valve-operating means including a double arm, a fork on each end of said double arm, said fork engaging the flanges on said pairs of piston valves, a shaft on which said double arm is mounted, said shaft being concentric to one of said bearing sleeves, and a reverse-motion lever secured to said shaft, said reverse-motion lever being operable manually.

19. A power amplifier having a connection for a source of fluid pressure, an inlet and an outlet for said fluid, a movable element provided with a surface against which the fluid pressure is arranged to act, connecting means connected to said element for performing work, a piston valve for controlling the intake of said fluid from said inlet to said element, a sleeve member having progressively staggered ports coacting with said piston valve, a piston valve for controlling the outlet side of said fluid to said element, said piston valves being connected for movement in opposite directions simultaneously, and manual means for controlling said piston valves.

20. A proportional fluid pressure double-acting power amplifier of the type adapted to assist a manually operated means in the movement and control of a work performing element for power operation for use in a single hydraulic-pump circulating system whenever the pump is in operation including means to operate the work performing element irrespective of the operation of said pump, in which there are provided inlet and outlet connections on the amplifier to receive fluid from the return the same to such system, movable walls to receive fluid from said inlet connection, a pair of distributing inlet valves for directing the flow from said inlet into two circuits, a pair of reaction outlet valves for controlling the pressure in each of said circuits, means for controlling said valves, passages from said distributing valves to said movable walls, and additional passages from said movable walls to said reaction outlet valves, said valves including reaction elements thereon and arranged normally to be in hydraulic balanced relation with respect to each other so as to permit equal circulation of fluid through both circuits from the inlet to the outlet, in order that the movement of said valve controlling means in either direction will open one of the distributor valves and correspondingly close a reaction valve against pressure to increase modulated pressure against one of the movable walls and to also provide increased resistance to said valve controlling means, said valve controlling means comprising a separate element located between the manual means and the work performing element and arranged to have a movement in another direction than the direction of movement of the manual means according to the direction of movement applied from said balanced position.

EDWIN G. STAUDE.

REFERENCES CITED

The following references are of record in the file of this patent:

UNITED STATES PATENTS

| Number | Name | Date |
|---|---|---|
| 754,277 | Becher | Mar. 8, 1904 |
| 860,461 | Germiner | July 6, 1907 |
| 1,890,041 | McLeod | Dec. 8, 1932 |
| 2,095,841 | Staude | Oct. 12, 1937 |
| 2,382,866 | Edge et al. | Aug. 14, 1945 |
| 2,398,421 | Frische et al. | Apr. 16, 1946 |
| 2,400,418 | Hofbauer | May 14, 1946 |

FOREIGN PATENTS

| Number | Country | Date |
|---|---|---|
| 19,980 | Great Britain | Sept. 23, 1908 |